United States Patent [19]

Isaacson et al.

[11] 4,361,636

[45] Nov. 30, 1982

[54] IONIC POLYESTERS FOR ELECTRICALLY PHOTOSENSITIVE COMPOSITE PARTICLES, MATERIALS, ELEMENTS AND PHOTOELECTROPHORETIC IMAGING METHODS

[75] Inventors: Henry V. Isaacson, Webster; Michael T. Regan, Fairport, both of N.Y.

[73] Assignee: Eastman Kodak Company, Rochester, N.Y.

[21] Appl. No.: 256,338

[22] Filed: Apr. 22, 1981

[51] Int. Cl.³ .......................................... G03G 17/04
[52] U.S. Cl. ...................................... 430/32; 430/37; 430/73
[58] Field of Search .................. 430/32, 37, 40, 41, 430/73, 74, 96

[56] References Cited

U.S. PATENT DOCUMENTS

| | | | |
|---|---|---|---|
| 3,703,372 | 11/1972 | Merrill | 430/74 |
| 3,923,509 | 12/1975 | Kuehn | 430/96 X |
| 4,284,699 | 8/1981 | Berwick et al. | 430/96 |
| 4,322,487 | 3/1982 | Merrill et al. | 430/37 |

Primary Examiner—Roland E. Martin, Jr.
Attorney, Agent, or Firm—Torger N. Dahl

[57] ABSTRACT

Novel polyesters comprising repeating units from:
(a) a diacid derived component comprising a group selected from the class consisting of an alkali metal or ammonium -sulfoarylene, -sulfoaryloxyarylene, -sulfocycloalkylene, -iminodisulfonylarylene, -iminobis(-sulfonylarylene) or -sulfoaralkylarylene; and
(b) a diol or diacid derived component comprising a group selected from the class consisting of bis(N-alkyl-N-alkyleneaminoaryl)arylalkane; bis(N-alkyl-N-alkyleneaminoaryl)diarylalkane; bis(N-alkyl-N-alkyleneaminoaryl)isoalkane; bis(N-alkyl-N-alkyleneaminoaryl)cycloalkane; dialkyleneaminotetraarylalkane; bis(alkylenearyl)arylamine and alkylenetriarylamine;

are useful in electrically photosensitive composite particles, materials, layers and photoelectrophoretic imaging methods.

7 Claims, 4 Drawing Figures

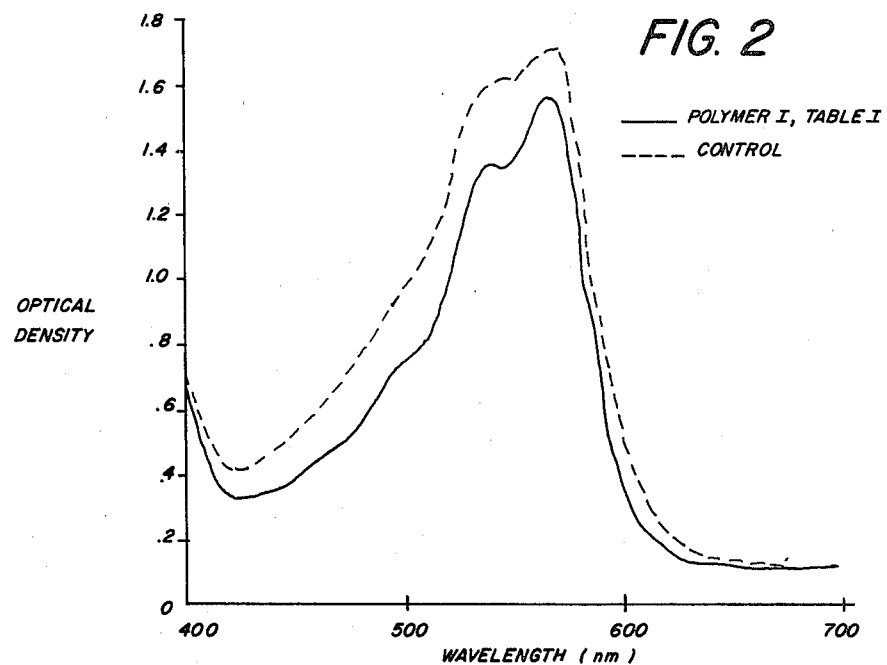
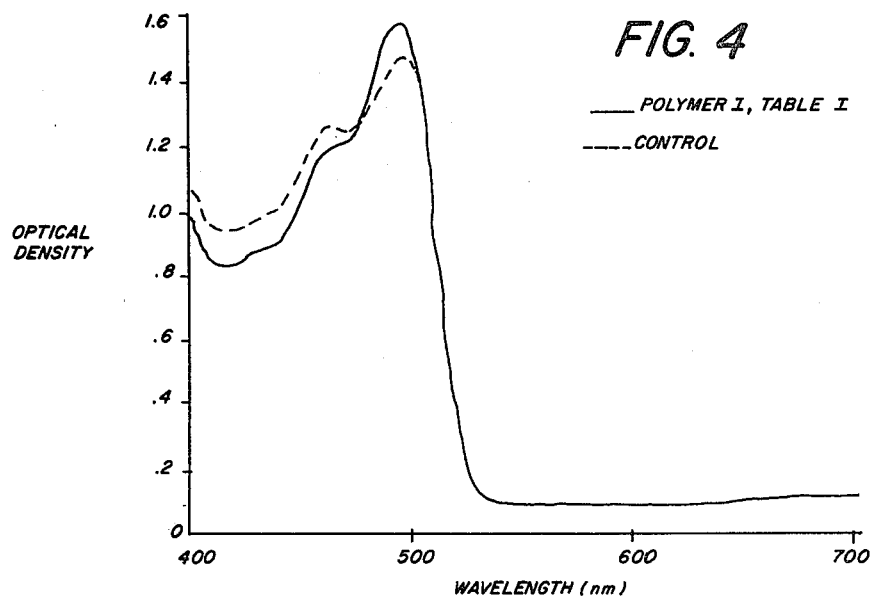

IONIC POLYESTERS FOR ELECTRICALLY PHOTOSENSITIVE COMPOSITE PARTICLES, MATERIALS, ELEMENTS AND PHOTOELECTROPHORETIC IMAGING METHODS

FIELD OF THE INVENTION

This invention relates to novel ionic polyesters and in particular to electrically photosensitive composite particles, materials, layers and elements containing such polyesters. The invention also relates to photoelectrophoretic imaging methods which utilize the composite particles, materials, layers and elements.

BACKGROUND OF THE INVENTION

In the past, there has been extensive description in the patent and other technical literature of photoelectophoretic imaging method. A description of photoelectrophoretic imaging methods may be found in U.S. Pat. Nos. 2,758,939 by Sugarman issued Aug. 14, 1956; 2,940,847, 3,100,426, 3,140,175 and 3,143,508, all by Kaprelian; 3,384,565, 3,384,488 and 3,615,558, all by Tulagin et al.; 3,384,566 by Clark; 3,383,993 by Yeh; and 3,976,485 by Groner.

In each of the foregoing photoelectrophoretic imaging methods, an imaging layer comprising electrically photosensitive material is subjected to the influence of an electric field and exposed to an image pattern of electromagnetic radiation to which the electrically photosensitive material is sensitive. The electrically photosensitive material is caused to imagewise-migrate photoelectrophoretically in the layer to form a record of the imaging electromagnetic radiation.

Regardless of the particular photoelectrophoretic imaging method employed, an essential component of any such method is the electrically photosensitive material. And, of course, to obtain an easy-to-read visible image it is desirable that the electrically photosensitive material be colored, as well as electrically photosensitive. Accordingly, there exists a continuing effort to find materials which possess both useful levels of electrical photosensitivity and which exhibit good colorant properties.

The art discloses the use of electrically photosensitive particles comprising a polymer and a pigment for use in photoelectrophoretic imaging methods. Many of the polymers disclosed for such use, however, have a deleterious effect on the electrically photosensitive particles in that the polymers insulate the particles from the electrodes, thereby inhibiting development. British Patent Specifications Nos. 1,242,262 and 1,440,553 disclose the use of polymeric photoconductors in such particles. However, this art does not teach that composite particles which include a polymeric photoconductor have any special utility in improving the results of imaging methods. Indeed, only a few photoconductive polymers, such as polyvinylcarbazole, are disclosed in the art.

Commonly assigned U.S. patent application Ser. No. 064,972, filed Aug. 8, 1979, by Merrill et al., now U.S. Pat. No. 4,322,487 issued Mar. 30, 1982, discloses many polymers having photoconductive repeating units which are extremely useful in forming electrically photosensitive composite particles. However, further improvement in these composite particles would be desirable; for example, improvements in tinctorial strength, sharper absorption peaks and the production of finer crystalline pigments to reduce light scatter would offer advantages.

SUMMARY OF THE INVENTION

The present invention provides novel ionic polyesters which are useful in forming electrically photosensitive composite particles. Such composite particles contain smaller colorant particles than the composite particles disclosed in the aforementioned Merrill et al. U.S. Ser. No. 064,972, now U.S. Pat. No. 4,322,487 issued Mar. 30, 1982. It appears that the polyesters of this invention enable the colorant to be ground into smaller particles during the process of forming composite particles. The smaller pigment crystal sizes provide electrically photosensitive imaging layers which have greater tinctorial strength, sharper absorption peaks and lower light scatter than prior art composite particles of U.S. patent application Ser. No. 064,972, now U.S. Pat. No. 4,322,487 issued Mar. 30, 1982.

The novel polyesters of this invention comprise repeating units from:

(a) a diacid derived component comprising a group selected from the class consisting of an alkali metal or ammonium-sulfoarylene, -sulfoaryloxyarylene, -sulfocycloalkylene, -iminodisulfonylarylene, -iminobis(sulfonylarylene) or -sulfoaralkylarylene; and (b) a diol or diacid derived component comprising a group selected from the class consisting of bis(N-alkyl-N-alkyleneaminoaryl)arylalkane; bis(N-alkyl-N-alkyleneaminoaryl)diarylalkane; bis(N-alkyl-N-alkyleneaminoaryl)isoalkane; bis(N-alkyl-N-alkyleneaminoaryl)cycloalkane; dialkyleneaminotetraarylalkane; bis(alkylenearyl)arylamine and alkylenetriarylamine.

All of the foregoing novel ionic polyester compositions of matter are applicants' invention with the exception of those polyesters in which an alkylenetriarylamine repeating unit is pendant from the polyester backbone. The latter polyesters are the subject matter of copending commonly assigned U.S. patent application entitled CONDENSATION POLYMERIC PHOTOCONDUCTORS CONTAINING PENDANT ARYLAMINES, filed July 20, 1981, in the names of Noonan et al. Applicants, however, discovered their utility in photoelectrophoretic imaging methods.

The electrically photosensitive composite particles provided by the present invention comprise a pigment and an ionic polyester of this invention.

As will be explained hereinafter, the pigment may or may not be electrically photosensitive. This represents a particularly useful feature as it permits the use of nonelectrically photosensitive pigments as part or all of the colorant component contained in the composite particles of the invention. Regardless of whether or not an electrically photosensitive pigment is contained in the composite particles of the invention, the resultant composite particles are electrically photosensitive.

The phrase "electrically photosensitive composite particles" as used herein refers to composite particles which, when placed between two electrodes, subjected to an applied electric field and exposed to radiation to which said particles are sensitive, migrate to one of the two electrodes.

In general, the composite particles of the present invention exhibit greater photosensitivity in migration imaging methods than an electrically photosensitive pigment alone.

DESCRIPTION OF THE DRAWING

FIGS. 2, 3 and 4 are absorption spectra of the electrically photosensitive layers provided by the present invention compared to the absorption spectra of certain prior art electrically photosensitive layers.

PREFERRED EMBODIMENTS

Figure 1:
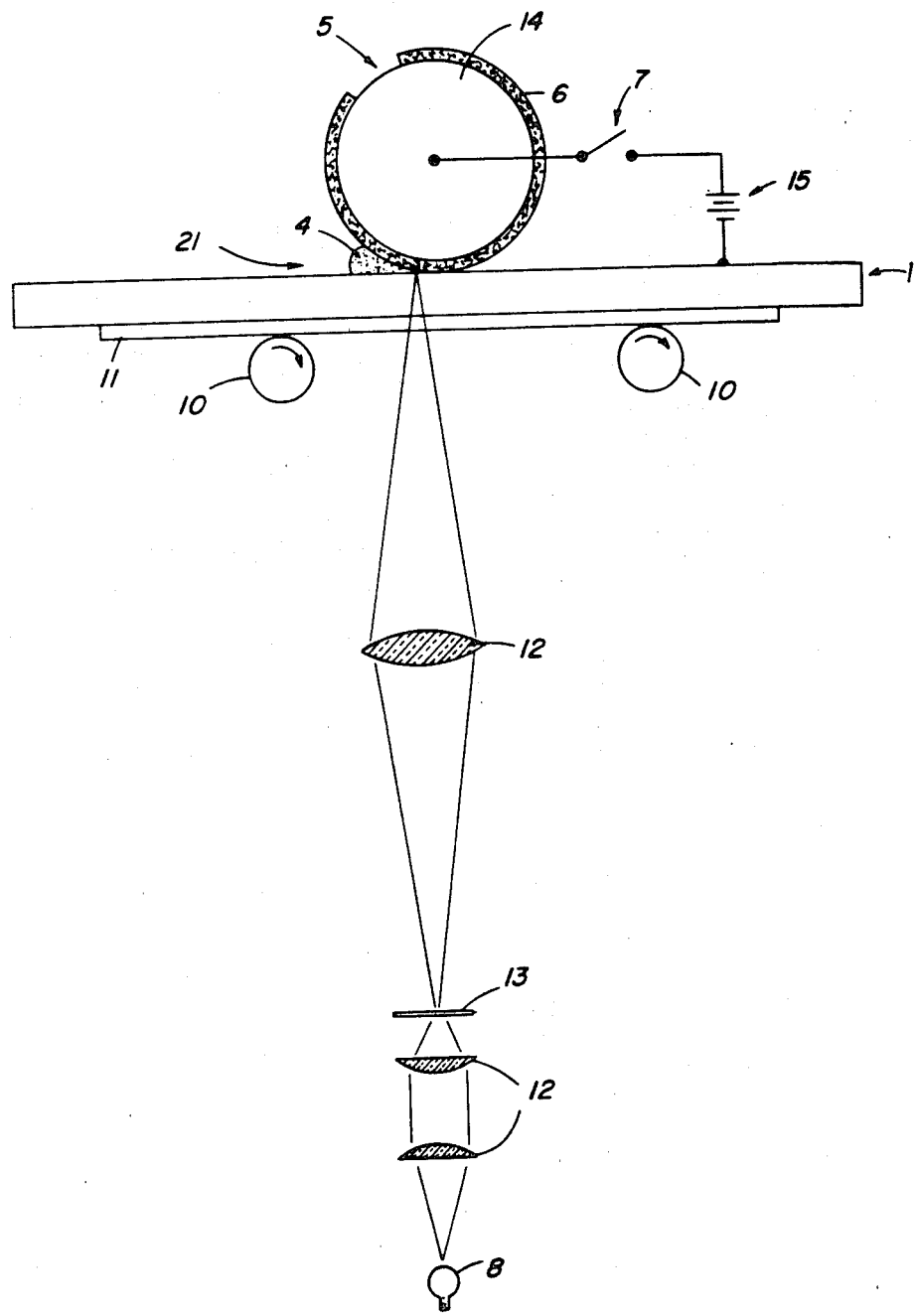
FIG. 1 is a schematic drawing of an apparatus for performing an imaging method using the composite particles of the present invention.

In a preferred embodiment the present invention provides novel ionic polyesters having the structure:

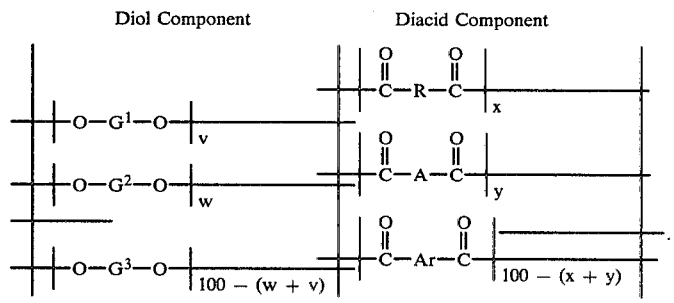

wherein:

y is about 20 to about 100 mole percent of the diol component, except when R or Ar is a group defined for $G^1$, v may be 0;

w is about 0 to about 80 mole percent of the diol component;

x is about 85 to about 99 mole percent of the diacid component;

y is about 1 to about 15 mole percent of the diacid component;

$G^1$ represents:

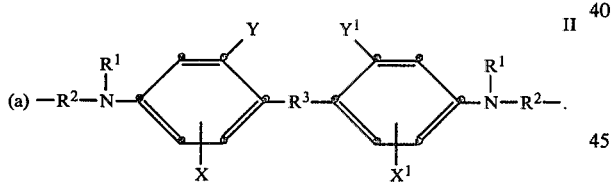

wherein:

$R^1$ represents alkyl, aralkyl or aryl;
$R^2$ represents alkylene or arylalkylene;
X and $X^1$, which are the same or different, represent hydrogen, alkyl, alkoxy, hydroxyl, cyano, $NO_2$ or halogen;
Y and $Y^1$, which are the same or different, represent hydrogen, alkyl, alkoxy, hydroxyl, cyano, halogen or $NO_2$;
$R^3$ represents alkylene, arylalkylene, diarylalkylene, isoalkylene and cycloalkylidene, which can be substituted with hydrogen, alkoxy, hydroxyl, halogen, alkyl, dialkylamino, cycloalkyl, cycloalkenyl, alkyl and aryl;

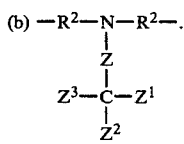

wherein:
$R^2$ is as defined for Formula II;
Z represents arylene, and
$Z^1$, $Z^2$ and $Z^3$, which are the same or different, represent aryl;

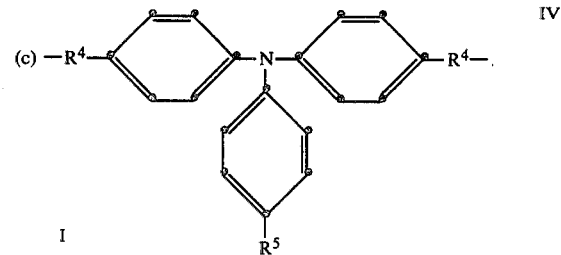

wherein:
$R^4$ represents alkylene, alkyleneoxy or alkylenecarbonyl and $R^5$ represents hydrogen, alkyl or alkoxy; or

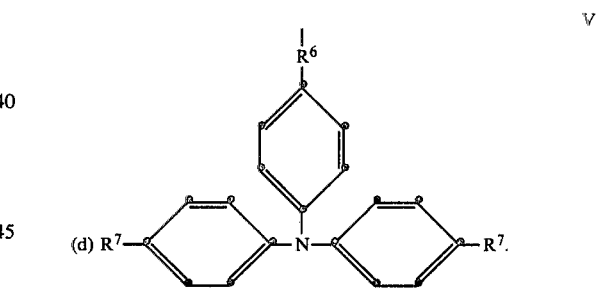

wherein:
$R^6$ is alkylene and $R^7$ represents hydrogen, alkyl, alkaryl, aralkyl or alkoxy;

$G^2$ and $G^3$, which are always different, represent oxybis(alkylene), cycloalkylenedialkylene, cycloalkylenedioxyalkylene, arylaminedialkylene, arylene, piperazinylenedialkylene, cycloalkylene or a straight- or branched-chain alkylene;

R and Ar, which are always different, represent a component selected from the group consisting of alkylene, cycloalkylene and arylene, or a component having a structure defined for $G^1$ above; and A represents an alkali metal or ammonium -sulfoarylene, -sulfoaryloxyarylene, -sulfocycloalkylene, -iminodisulfonylarylene, -iminobis(sulfonylarylene) or -sulfoaralkylarylene.

The terms "cycloalkyl" and "cycloalkenyl" refer to groups having 4-10 carbon atoms and include substituted cycloalkyl and cycloalkenyl. The terms "alkyl", "alkylene" and "alkoxy" refer to compounds generally containing from 1-10 carbon atoms and include substituted alkyl, alkylene and alkoxy groups. "Aryl" and "Ar" refer to substituted and unsubstituted phenyl, naphthyl and anthryl groups. Substituents for the foregoing groups are selected from the group consisting of dialkylamino, alkylamino and amino, as well as the groups represented by X, $X^1$, Y and $Y^1$.

In another aspect, the present invention provides electrically photosensitive materials from which imaging layers can be formed. The materials comprise an electrically insulating binder and the composite particles provided by this invention.

The electrically photosensitive composite particles provided in the present invention are useful in forming monocolor (monochrome) images or multicolor (polychrome) images.

DETAILED EXPLANATION OF THE INVENTION

We will now proceed to describe in detail specific ionic polyesters and their utility in electrically photosensitive composite particles, materials, layers and photoelectrophoretic imaging methods. Methods of making the composite particles, materials, layers and methods of using such layers will also be explained and exemplified.

Table I presents a partial listing of representative ionic polyesters of the present invention. In Table I, the symbol —·— represents a carbon atom having sufficient hydrogen atoms to complete carbon valence requirements. Et represents ethyl; Ph represents phenyl; i-Pr represents isopropyl and i-Bu represents isobutyl.

TABLE I

1. Poly[4,4'-bis(N—ethyl-N—ethyleneamino)-2,2'-dimethyltriphenylmethane terephthalate-co-3,3'-sodioiminobis(sulfonylbenzoate)]

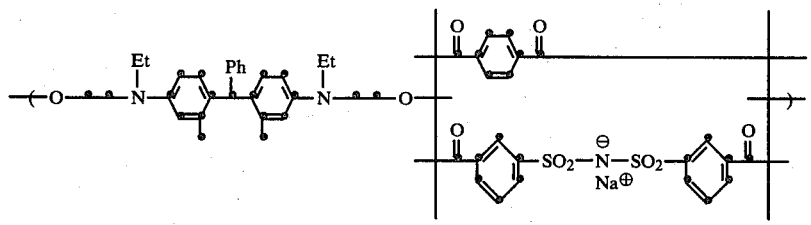

2. Poly[4,4'-bis(N—ethyl-N—ethyleneamino)-2,2'-dimethyltriphenylmethane-co-tetramethylene terephthalate-co-3,3'-sodioiminobis(sulfonylbenzoate)]

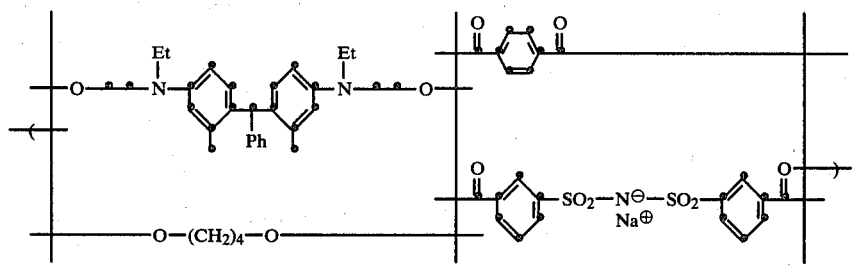

3. Poly[4,4'-bis(N—ethyl-N—ethyleneamino)-2,2'-dimethyltriphenylmethane terephthalate-co-5-(4-tolylsulfonylpotassioiminosulfonyl)isophthalate]

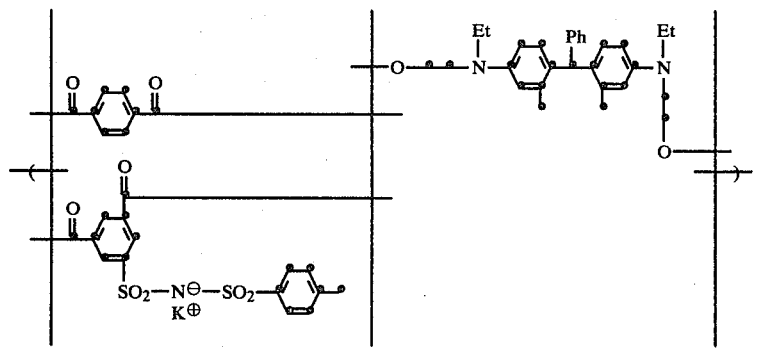

4. Poly[4,4'-bis(N—ethyl-N—ethyleneamino)-2,2'-dimethyltriphenylmethane terephthalate-co-5-sodiosulfoisophthalate]

TABLE I-continued

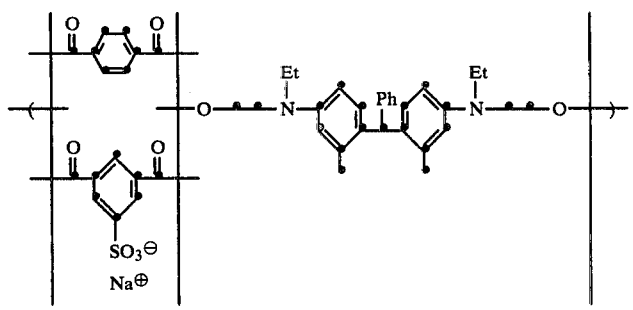

5. Poly[4,4'-bis(N—ethyl-N—ethyleneamino)-2,2'-dimethyltriphenylmethane-co-tetramethylene terephthalate-co-5-sodiosulfoisophthalate]

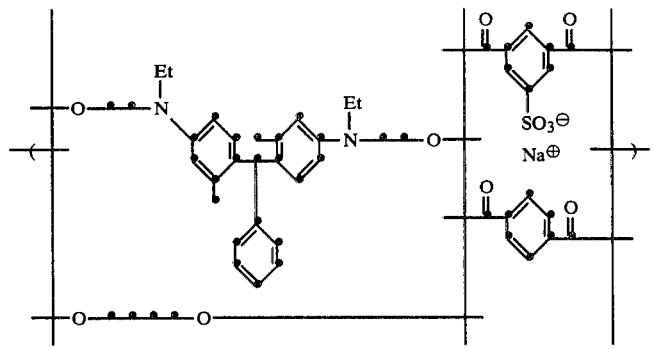

6. Poly[4,4'-bis(N—ethyl-N—ethyleneamino)-2,2'-dimethyltriphenylmethane-co-tetramethylene terephthalate-co-5-(4-tolylsulfonylpotassio-iminosulfonyl)isophthalate]

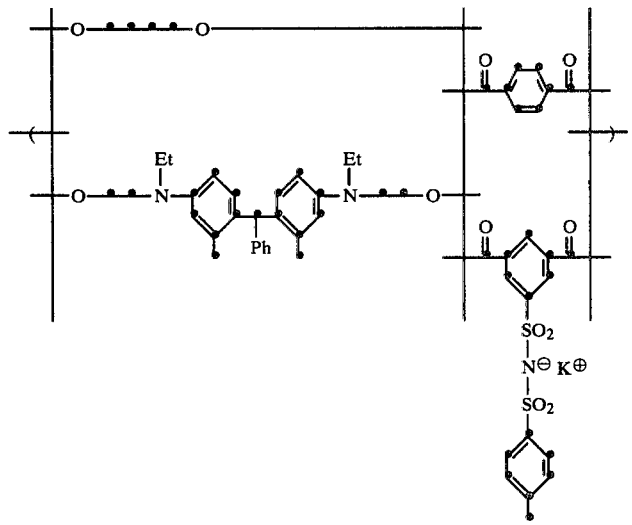

7. Poly[4,4'-bis(N—ethyl-N—ethyleneamino)-2,2'-dimethyltriphenylmethane-co-isopentylene terephthalate-co-3,3'-sodioiminobis(sulfonylbenzoate)]

TABLE I-continued

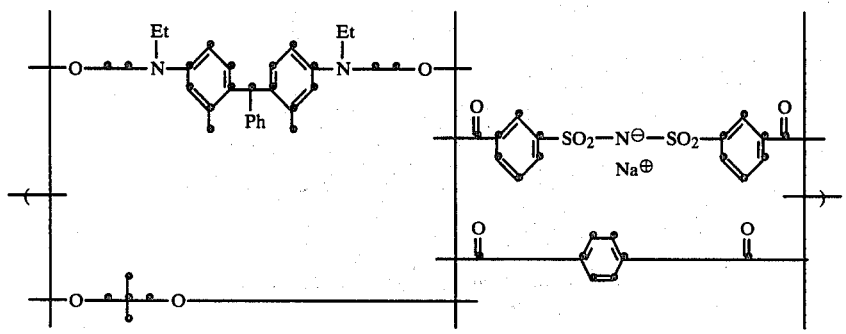

8. Poly[4,4'-bis(N—ethyl-N—ethyleneamino)-2,2'-dimethyltriphenylmethane-co-ethylene terephthalate-co-3,3'-sodioiminobis(sulfonylbenzoate)]

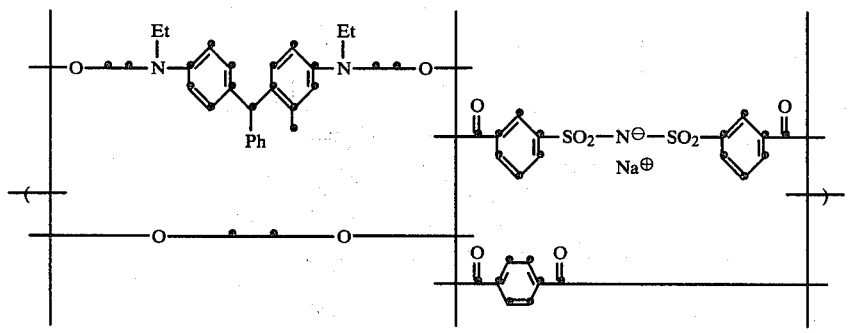

9. Poly[4,4'-bis(N—ethyl-N—ethyleneamino)-2,2'-dimethyltriphenylmethane-co-1,4-cyclohexanedioxyethylene terephthalate-co-3,3'-sodioiminobis(sulfonylbenzoate)]

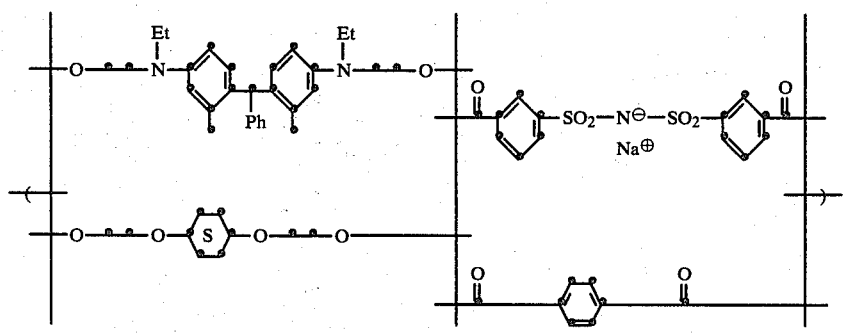

10. Poly[4,4'-bis(N—ethyl-N—ethyleneamino)-2,2'-dimethyltriphenylmethane-co-tetramethylene-1,4-cyclohexanedicarboxylate-co-3,3'-sodioiminobis(sulfonylbenzoate)]

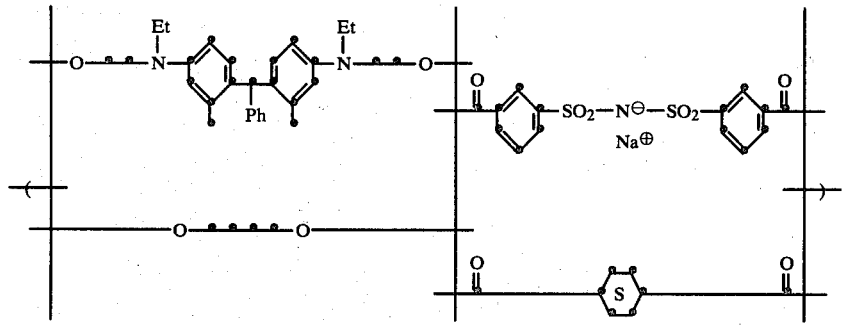

11. Poly[4,4'-bis(N—ethyl-N—ethyleneamino)-2,2'-dimethyltriphenylmethane-co-tetramethylene isophthalate-co-3,3'-sodioiminobis(sulfonylbenzoate)]

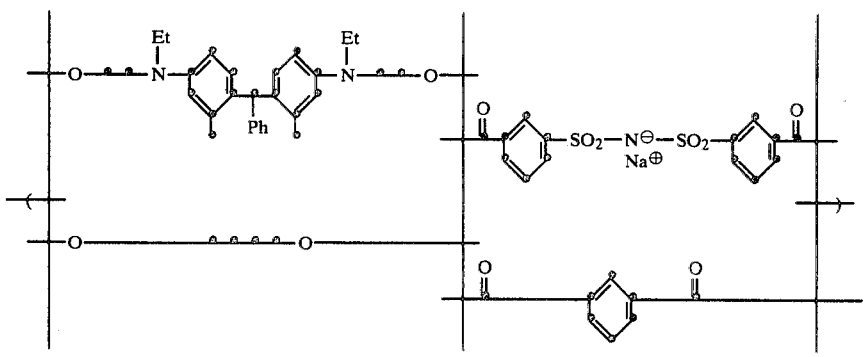

12. Poly[4,4'-bis(N—ethyl-N—ethyleneamino)-2,2'-dimethyltriphenylmethane-co-hexamethylene terephthalate-co-3,3'-sodioiminobis(sulfonylbenzoate)]

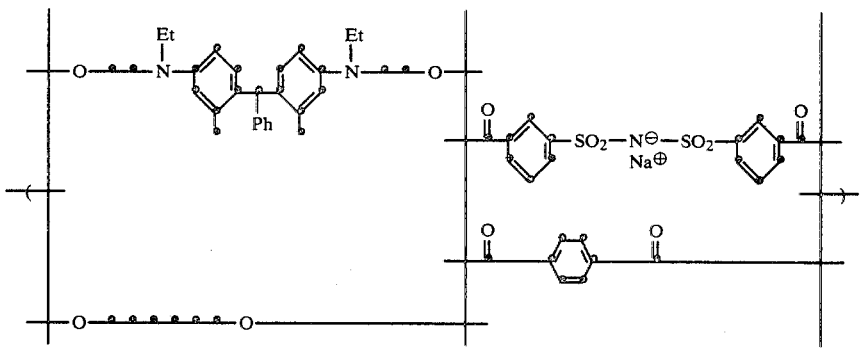

13. Poly[4,4'-bis(N—ethyl-N—ethyleneamino)-2,2'-dimethyltriphenylmethane-co-decamethylene terephthalate-co-3,3'-sodioiminobis(sulfonylbenzoate)]

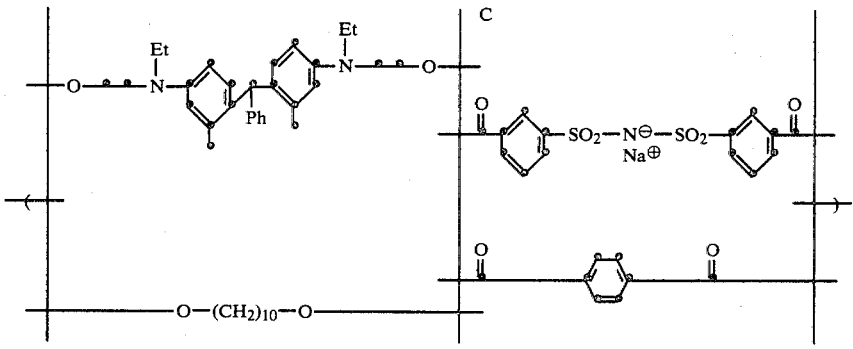

14. Poly[4,4'-bis(N—ethyl-N—ethyleneamino)-2,2'-dimethyltriphenylmethane-co-oxybisethylene terephthalate-co-3,3'-sodioiminobis(sulfonylbenzoate)]

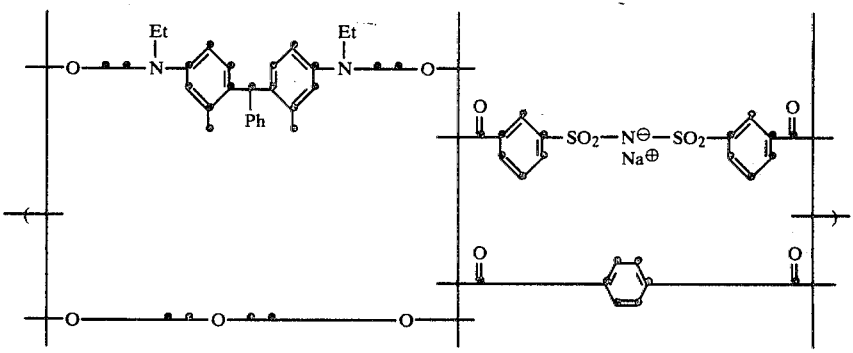

15. Poly[4,4'-bis(N—ethyl-N—ethyleneamino)-2,2-dimethyltriphenylmethane-co-1,4-diethylenepiperazine terephthalate-co-3,3'-sodioiminobis(sulfonylbenzoate)]

TABLE I-continued

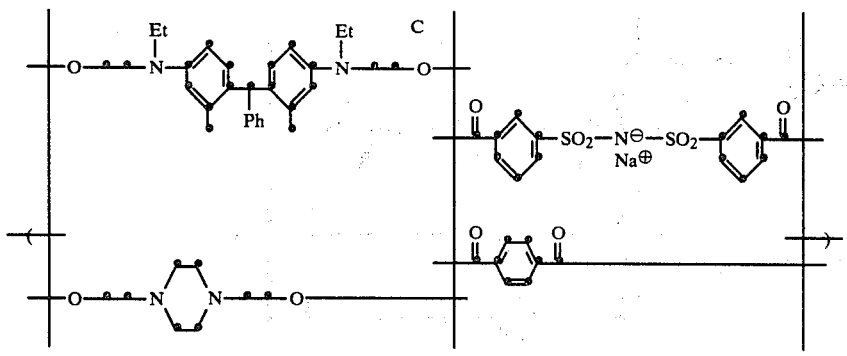

16. Poly[4,4′-bis(N—ethyl-N—ethyleneamino)-2,2′-dimethyltriphenylmethane-co-N,N—diethyleneaniline terephthalate-co-3,3′-sodioiminobis(sulfonylbenzoate)]

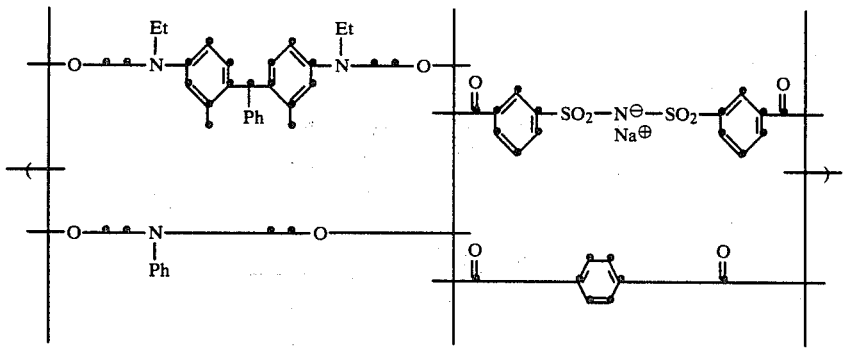

17. Poly[4,4′-bis(N—ethyl-N—ethyleneamino)-2,2′-dimethyltriphenylmethane-co-tetramethylene-co-isopentylene terephthalate-co-3,3′-sodioiminobis(sulfonylbenzoate)]

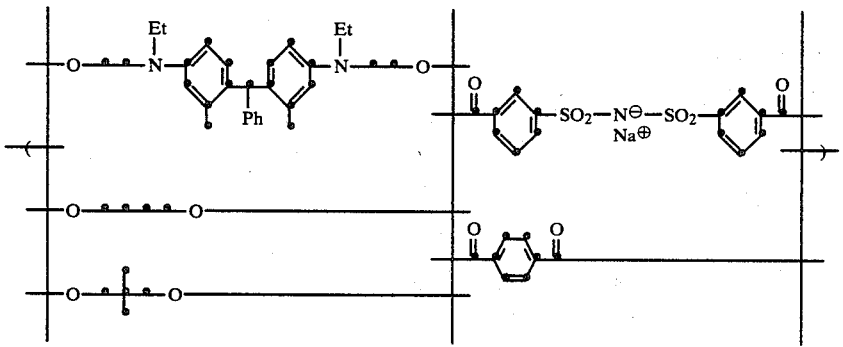

18. Poly[4,4′-bis(N—ethyl-N—ethyleneamino)-2,2′-dimethyltriphenylmethane-co-1,4-cyclohexanedimethylene-co-oxybisethylene terephthalate-co-3,3′-sodioiminobis(sulfonylbenzoate)]

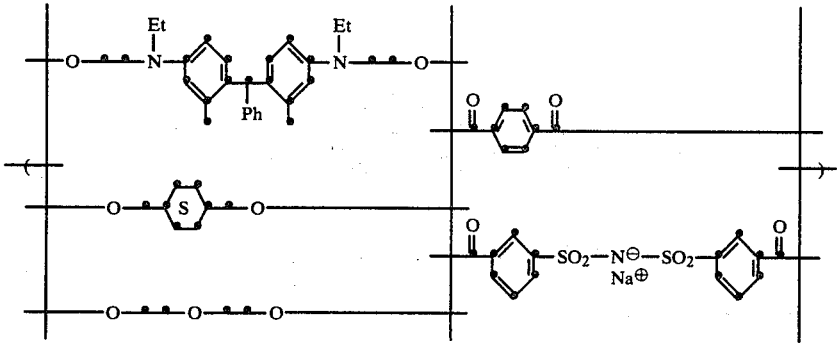

19. Poly[4,4′-bis(N—ethyl-N—ethyleneamino)-2,2′-dimethyltriphenylmethane-co-tetramethylene terephthalate-co-1,4-cyclohexanedicarboxylate-co-3,3′-sodioiminobis(sulfonylbenzoate)]

TABLE I-continued

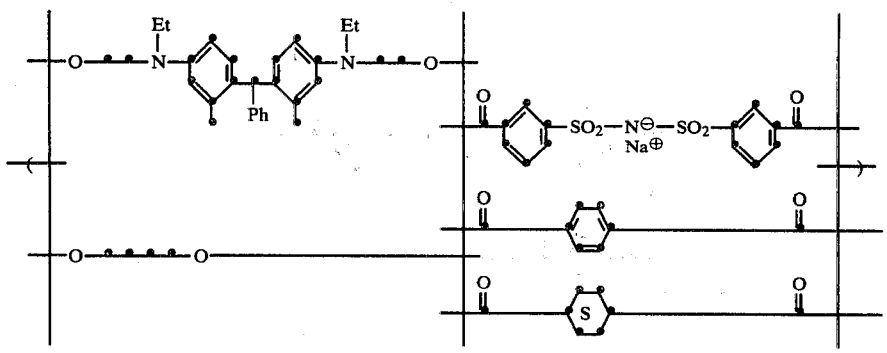

20. Poly[4,4'-bis(N—ethyl-N—ethyleneamino)-2,2'-dimethyltriphenylmethane-co-cyclohexylene-co-isopentylene terephthalate-co-3,3'-sodioiminobis(sulfonylbenzoate)]

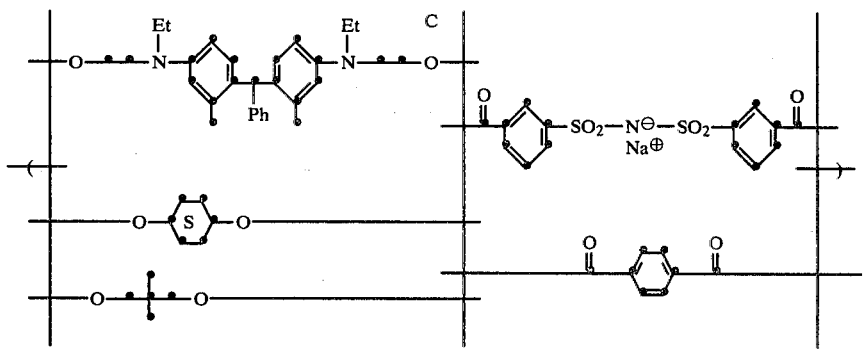

21. Poly[4,4'-bis(N—ethyl-N—ethyleneamino)-2,2'-dimethyltriphenylmethane-co-tetramethylene-co-cyclohexylene terephthalate-co-3,3'-sodioiminobis(sulfonylbenzoate)]

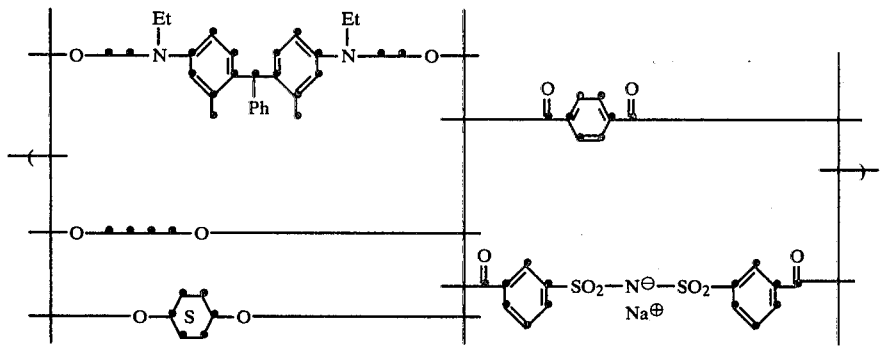

22. Poly[4,4'-bis(N—ethyl-N—ethyleneamino)-2,2'-dimethyltriphenylmethane-co-tetramethylene-co-oxybisethylene terephthalate-co-3,3'-sodioiminobis(sulfonylbenzoate)]

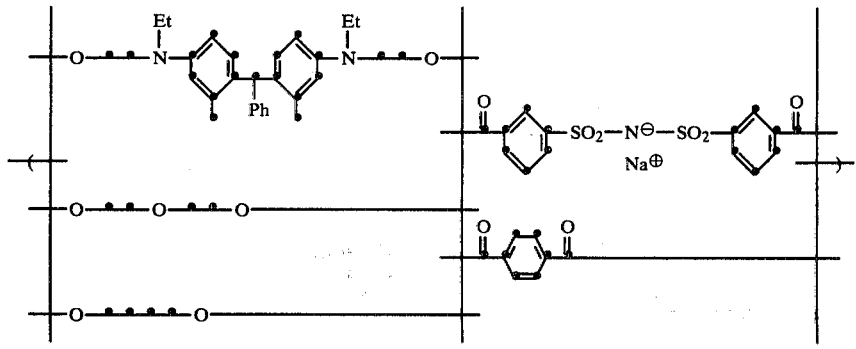

23. Poly[4,4'-bis(N—ethyl-N—ethyleneamino)-2,2'-dimethyltriphenylmethane-co-tetramethylene-1,4-cyclohexanedicarboxylate-co-5-sodiosulfoisophthalate]

TABLE I-continued

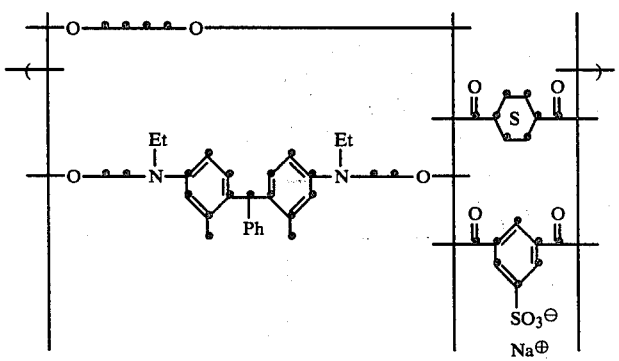

24. Poly[4,4'-bis(N—ethyl-N—ethyleneamino)-2,2'-dimethyltriphenylmethane-co-tetramethylene-1,4-cyclohexanedicarboxylate-co-5-(4-tolylsulfonylpotassioiminosulfonyl)isophthalate]

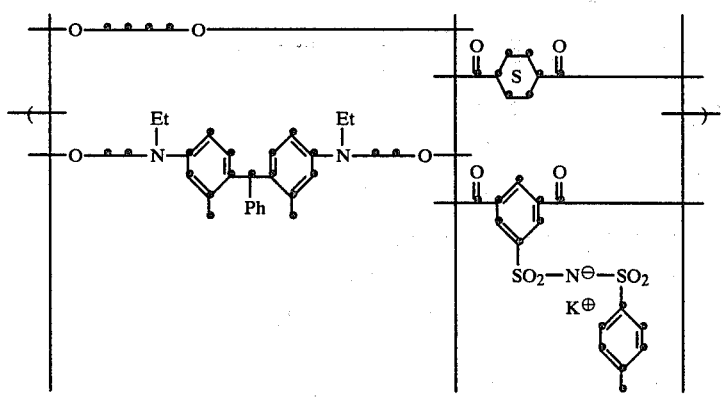

25. Poly[1,1-bis(4-[N—ethyl-N—ethyleneamino)-2-methylphenyl]isobutylidene terephthalate-co-3,3'-sodioiminobis(sulfonylbenzoate)]

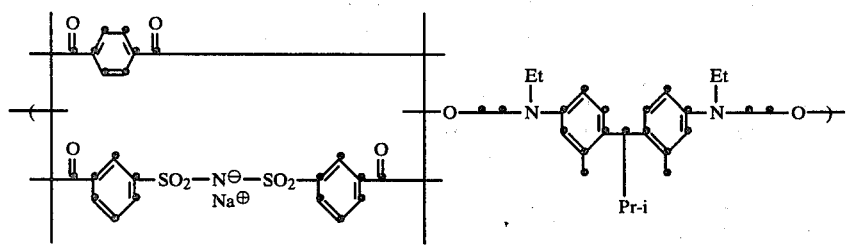

26. Poly[1,1-bis(4-[N—ethyl-N—ethyleneamino]-2-methylphenyl)isobutylidene terephthalate-co-4,4'-sodioiminobis(sulfonylbenzoate)]

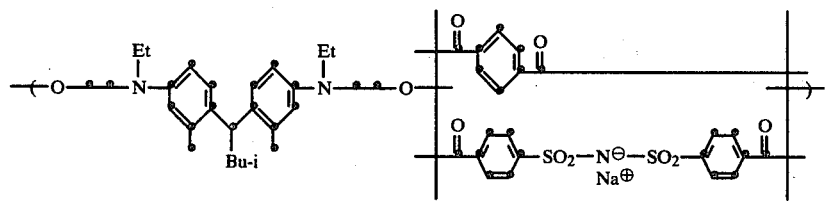

27. Poly[1,1-bis(4-[N—ethyl-N—ethyleneamino]-2-methylphenyl)isobutylidene-co-tetramethylene terephthalate-co-3,3'-sodioiminobis(sulfonylbenzoate)]

TABLE I-continued

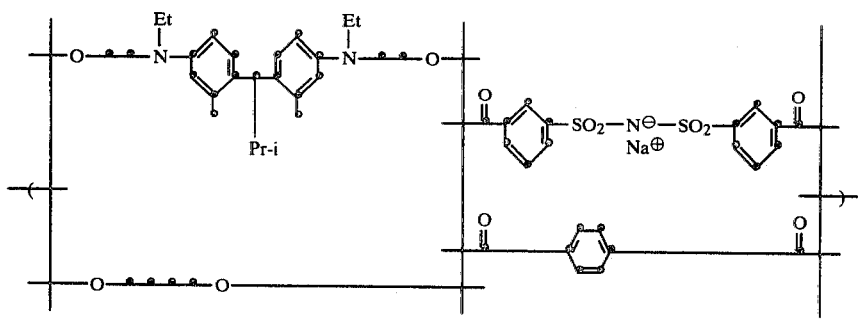

28. Poly[1,1-bis(4-[N—ethyl-N—ethyleneamino]-phenyl)cyclohexylidene terephthalate-co-3,3'-sodioiminobis(sulfonylbenzoate)]

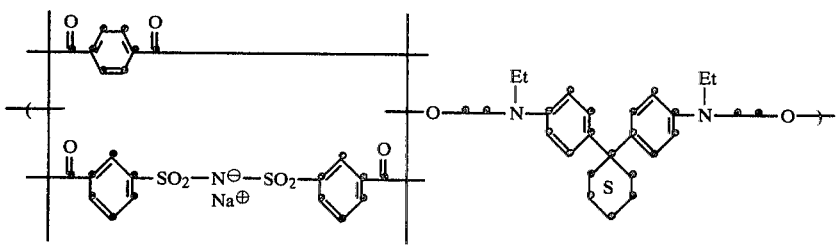

29. Poly[1,1-bis(4-[N—ethyl-N—ethyleneamino]-phenyl)cyclohexylidene-co-tetramethylene terephthalate-co-3,3'-sodioiminobis(sulfonylbenzoate)]

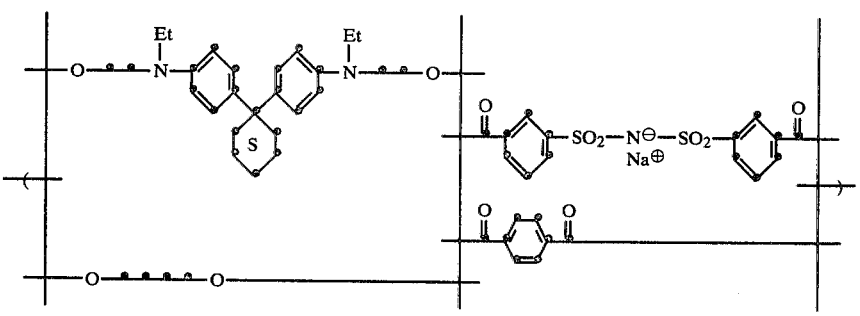

30. Poly[tetramethylene-4-di-p-tolylaminobenzylmalonate-co-3,3'-sodioiminobis(sulfonylbenzoate)]

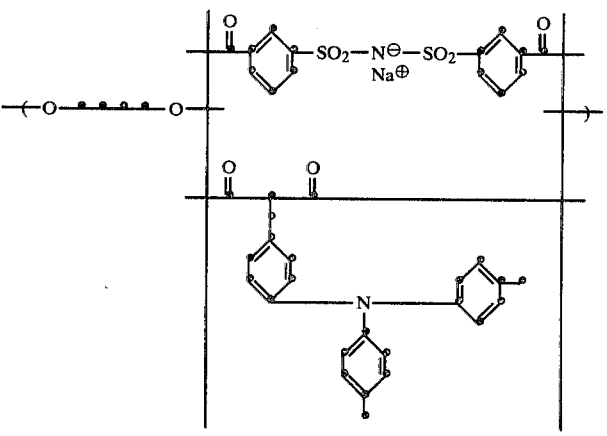

31. Poly[1,1-bis(4-[N—ethyl-N—ethyleneamino]-2-methylphenyl)-2-phenylethane-co-tetramethylene terephthalate-co-3,3'-sodioiminobis(sulfonylbenzoate)]

TABLE I-continued

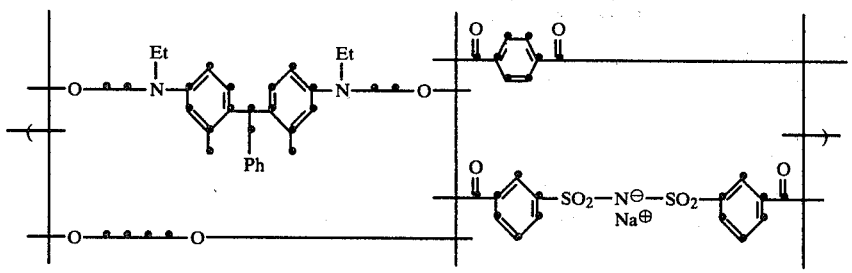

32. Poly[4-diethyleneaminotetraphenylmethane terephthalate-co-3,3'-sodioiminobis(sulfonylbenzoate)]

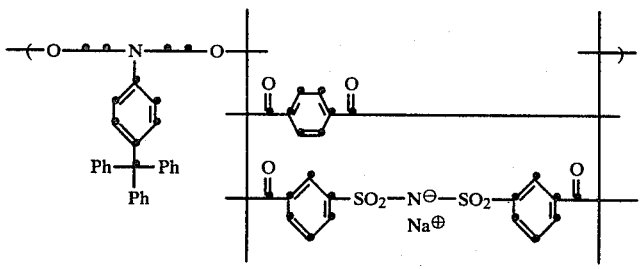

33. Poly[4,4'-bis(N—ethyl-N—ethyleneamino)-2,2'-dimethyltriphenylmethane-co-tetramethylene terephthalate-co-3,3'-lithioiminobis(sulfonylbenzoate)]

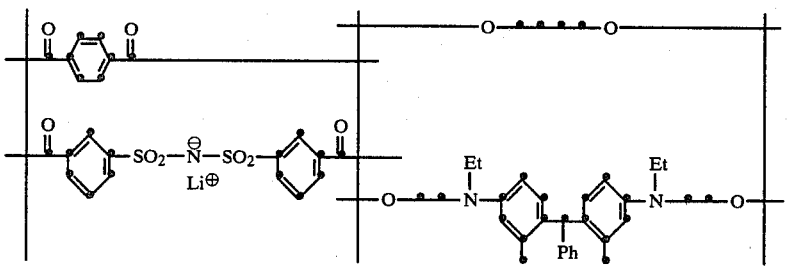

34. Poly[tetramethylene-N,N—bis(4-hydrocinnamate)-4-toluidine-co-3,3'-sodioiminobis(sulfonylbenzoate)]

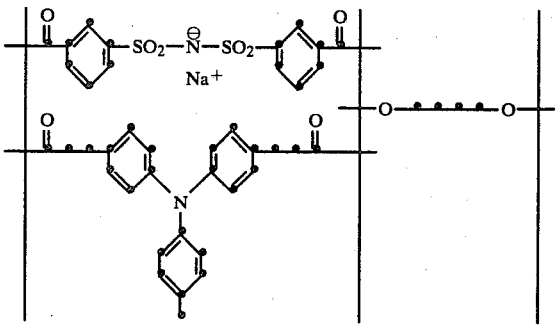

35. Poly[tetramethylene-N,N—bis(4-hydrocinnamate-4-anisidine-co-3,3'-sodioiminobis(sulfonylbenzoate)]

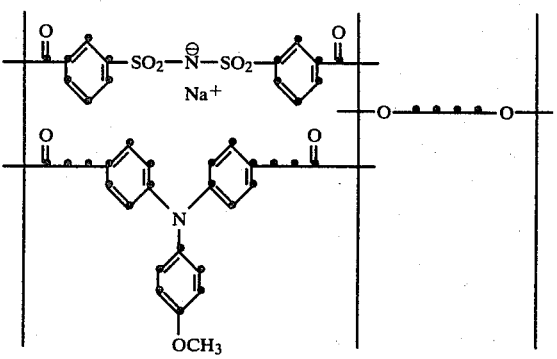

TABLE I-continued

36. Poly[4,4'-bis(N—ethyl-N—ethyleneamino)-tetraphenylmethane-co-tetramethylene terephthalate-co-3,3'-sodioiminobis(sulfonylbenzoate)]

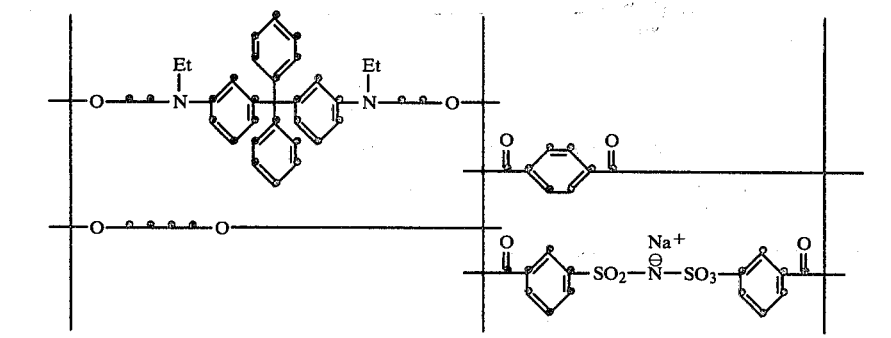

Useful compounds from which the photoconductive repeating units of the ionic polyesters may be derived include p-aminotetraarylmethanes, 4,4'-bis(N,N-dialkyl p-aminoaryl)arylmethanes, 1,1-bis-(N,N-dialkyl-p-aminoaryl)isoalkanes; 1,1-bis(N,N-dialkyl-p-aminoaryl)cyclohexanes; N,N-dialkyl-N-arylamines and triarylamines. A partial listing of representative compounds of each of these classes is listed in Table II. The compounds of Table II have been previously described as photoconductors or sensitizers in U.S. Pat. Nos. 3,542,544; 3,542,547; 3,141,770; 3,387,973; 3,615,402 and 3,820,989.

TABLE II 4,4'-bis(N-ethyl-N-2-hydroxyethylamino)-2,2'-dimethyltriphenylmethane
4,4'-bis(diethylamino)-2,2'-dimethyltriphenylmethane
4,4'-bis(diethylamino)-1,1,1-triphenylethane
4-diethylaminotetraphenylmethane
4,4'-bis(diethylamino)tetraphenylmethane
4-dimethylaminotetraphenylmethane
4-diisopropylaminotetraphenylmethane
4-dibenzylaminotetraphenylmethane
2-methyl-4-diethylaminotetraphenylmethane
3-methyl-4-diisopropylaminotetraphenylmethane
1,1-bis[4-(N-ethyl-N-hydroxyethylamino)-2-methylphenyl]isobutane
1,1-bis[4-(N-ethyl-N-hydroxyethylamino)phenyl]cyclohexane
1,1-bis-(4-N,N-diethylaminophenyl)cyclohexane
1,1-bis(4-N,N-diethylamino-2-methylphenyl)isobutane
1,1-bis(4-N-methyl-N-phenylaminophenyl)isobutane
1,1-bis(4-N-methyl-N-phenylaminophenyl)ethane
1,1-bis(4-N,N-diethylamino)-2,2'-dimethyltriphenylethane
tri-p-tolylamine
4-acetyltriphenylamine
triphenylamine
4-methoxytriphenylamine The compounds of Table II may be converted to diacids and diols to facilitate conversion to polyesters. Organic reactions which are useful in this regard are disclosed, for example, in U.S. Pat. Nos. 3,567,450; 3,658,520 and 3,767,393. Useful reaction schemes such as aldol condensation; Friedel-Crafts acylation; Reppe vinylation of nitrogen, oxygen or sulfur compounds; Ulmann phenylanthranilic acid synthesis; Vilsmeier formylation; and Wittig reaction are disclosed in *Organic Name Reactions* by Helmut Krauch and Werner Kunz, 2nd Ed., (1964), published by J. Wiley Co.

Polymerization of the Table II materials which have been converted as described above can be carried out according to well-known methods such as described in *Preparation Methods of Polymer Chemistry* by Sorenson and Campbell, 2nd Ed., 1968, published by Interscience Co. Best results are obtained with polymers which are insoluble in carrier liquids used to form photoelectrophoretic imaging dispersions. Accordingly, the useful molecular weight of the useful polymers will vary depending upon the particular carrier liquid chosen.

Any of a variety of aliphatic, alicyclic and aromatic dicarboxylic acids or their derivatives, such as esters, acid anhydrides and acid halides are useful in making the ionic polyesters of this invention. Such acids include succinic acid, sebacic acid, 2-methyladipic acid, diglycolic acid, thiodiglycolic acid, fumaric acid, cyclohexane-1,3-dicarboxylic acid, cyclohexane-1,4-dicarboxylic acid, cyclopentane-1,3-dicarboxylic acid, phthalic acid, isophthalic acid, terephthalic acid, t-butyl-isophthalic acid, 2,6-naphthalenedicarboxylic acid, 1,4-naphthalenedicarboxylic acid, 1,5-naphthalenedicarboxylic acid, 1,7-naphthalenedicarboxylic acid, 4,4'-diphenic acid, 4,4'-sulfonyldibenzoic acid, 4,4'-oxydibenzoic acid, binaphthyldicarboxylic acid and 9,10-triptycenedicarboxylic acid.

A wide variety of diols or their derivatives, including aliphatic, alicyclic and aromatic diols may be used in forming the ionic polyesters of this invention. Useful diols include alkylene glycols and monocyclic and polycyclic diols.

Useful monocyclic diols include 1,4-cyclohexane diol; 1,4-cyclohexanedimethanol; 1,4-cyclohexanediethanol; 1,4-bis(2-hydroxyethoxy)cyclohexane; 1,4-benzenedimethanol; 1,4-benzenediethanol; dihydroxyphenylene; cyclohexanediethanol; cyclohexanedioxyethanol; phenyliminodiethanol; 1,4-diethanolpiperazine and the like.

Useful alkylene glycols include ethylene glycol, diethylene glycol, triethylene glycol, 1,2-propanediol, 1,3-propanediol, 1,4-butanediol, 2,3-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2,4-trimethyl-1,6-hexanediol and 4-oxa-2,6-heptanediol. Useful polycyclic diols include norbornylene glycol and decahydro-2,6-naphthylenedimethanol.

Useful ionic materials for forming component A of the ionic polyesters include 3,3'-[(sodio-imino)disulfonyl]dibenzoic acid; 3,3'-[(potassio-imino)disulfonyl]dibenzoic acid; 3,3'-[(lithio-imino)disulfonyl]dibenzoic acid; 4,4′-[(lithio-imino)disulfonyl]dibenzoic acid; 4,4′-[(sodio-imino)disulfonyl]dibenzoic acid; 4,4′-[(potassio-imino)disulfonyl]dibenzoic acid; 3,4′-[(lithio-imino)-disulfonyl]dibenzoic acid; 3,4′-[(sodio-imino)disulfonyl]dibenzoic acid; [(potassio-imino)disulfonyl]-dinaphtholic acid; 5-[p-tolylsulfonyl-(potassio-imino)-sulfonyl]isophthalic acid; 4-[p-tolyl-sulfonyl-(sodio-imino)sulfonyl]-1,5-naphthalene-dicarboxylic acid; 5-[n-hexylsulfonyl (lithio-imino)-sulfonyl]-isophthalic acid; 2-[phenylsulfonyl(potassio-imino)sulfonyl]-isophthalic acid; 2-[phenylsulfonyl-(potassio-imino)sulfonyl]-terephthalic acid and functional derivatives thereof. These and other dicarboxylic acids useful in forming repeating units A of the crystalline polymeric polyesters used in this invention are disclosed by Caldwell and Jones U.S. Pat. No. 3,546,180 issued Dec. 8, 1970, the disclosure of which is here incorporated by reference.

In general, the ionic polyesters of Table I were prepared employing the usual two-stage polyesterification technique. Initially, the reactants were weighed into a 100 ml, round-bottomed polymerization flask. The flask was flushed with a slow stream of nitrogen for 30 minutes before it was immersed into a 180° C. salt bath. While still under a nitrogen atmosphere, the reactants were allowed to come to a clear melt before adding two drops of the catalyst, tetraisopropylorthotitanate. After the first stage of the polymerization was completed, the reaction was placed under a 0.2 mm atmosphere and the temperature increased to 235° C. with constant stirring controlled by a Cole-Parmer Constant Speed and Torque Control Unit. The second stage of the polyesterification is completed when the desired degree of inherent viscosity has been attached.

A wide variety of pigments are useful in combining with the described ionic polyester to form the electrically photosensitive composite particles of the present invention. Useful pigments may or may not be electrically photosensitive. In some of the ionic polyester-pigment combinations of this invention, the pigment by itself is not electrically photosensitive. However, when such pigments are combined with the ionic polyester described herein, a composite particle which is electrically photosensitive results. Accordingly, the ionic polyester-pigment combinations of the composite particles of the present invention are electrically photosensitive even when the pigments are not. Some of the useful pigments listed hereinbelow become soluble in the associated ionic polyester with heat. Images formed from composite particles comprising such pigments and ionic polyesters have improved optical density when the images are heat fixed.

A partial listing of representative electrically photosensitive pigments include the following materials disclosed in the indicated volumes of *Research Disclosure*. Each of the enumerated *Research Disclosures* (1 through 10) is expressly incorporated herein by reference.

(1) Aromatic vinyl (including bis vinyl) condensed heterocyclic nitrogen colorants described in *Research Disclosure* Item 15028, page 39, Volume 150, October, 1976.

(2) Aromatic vinyl (including bis vinyls) arylamines or N-containing heterocyclics described in *Research Disclosure* Item 15029, page 51, Volume 150, October, 1976.

(3) Merocyanines including bis-merocyanines, benzylidenes including bis-benzylidenes or mixed merocyanine-benzylidene colorants having a pyran, thiopyran, selenopyran or 1,4-dihydroxy pyridine nucleus. U.S. Pat. No. 4,145,215, granted Mar. 20, 1979, to VanAllan et al. *Research Disclosure* Item 16247, page 126, Volume 162, October, 1977.

(4) Merocyanines or benzylidene colorants containing an isoxazolone nucleus described in *Research Disclosure* Item 16259, page 61, Volume 162, October, 1977.

(5) Merocyanine or benzylidene colorants containing malononitrile or cyanomethylene substituents described in *Research Disclosure* Item 16257, page 75, Volume 162, October, 1977.

(6) Merocyanine or benzylidene colorants containing a barbituric or thiobarbituric acid nucleus described in *Research Disclosure* Item 16323, page 19, Volume 163, November, 1977.

(7) Allopolar colorants described in *Research Disclosure* Item 16324, page 33, Volume 163, November, 1977.

(8) Aryl substituted vinyl colorants, including arylene substituted bisvinyl, dibenzothienylsubstituted vinyl and dibenzothiendiyl substituted bisvinyl colorants described in *Research Disclosure* Item 16626, page 29, Volume 166, February, 1978.

(9) Cyclobutenylium colorants described in *Research Disclosure* Item 17320, page 231, Volume 173, September, 1978.

(10) Merocyanine or benzylidene having a quinolinedione or isoquinolinedione nucleus described in *Research Disclosure* Item 17645, page 64, Volume 176, December, 1978.

Other useful colorants are disclosed in the patents relating to photoelectrophoretic imaging methods noted in the "Background of the Invention".

The following is a general procedure for the preparation of the electrically photosensitive composite particles of the invention and the migration imaging dispersions containing such particles.

Typically from about 10 to about 80 weight percent of the colorant is dispersed or ground with the dissolved ionic polyester in a liquid carrier to submicron particles on a ball mill, Dynomill ® (manufactured by Willy A Bachofen Maschinenfabrik of Basil, Switzerland) or other milling device. As indicated before, grinding the colorant with the ionic polyesters of this invention results in colorants having a smaller particle size than obtainable with previous composite particles. The colorant/ionic polyester dispersion is added to a solvent in which the ionic polyester is insoluble. The polyester then precipitates out on the colorant surface.

An alternative method of making a composite particle is to either mill the pigment with a charge control agent before addition of, or simultaneously with the selected ionic polyester, or to add some of the charge-control agent after milling with the ionic polyester before precipitation.

The electrically photosensitive material of this invention comprises the electrically photosensitive composite particles optionally dispersed in an electrically insulating carrier material such as an electrically insulating liquid, or an electrically insulating, liquefiable matrix material, such as a heat and/or solvent liquefiable polymeric material or a thixotropic polymeric material.

The electrically photosensitive imaging material can be prepared by admixing on a weight-to-weight basis, (a) about 1 to about 10 weight percent of electrically photosensitive composite particles, (b) about 1 to about 10 weight percent of a stabilizer or charge control agent, if desired, and (c) about 80 to about 98 weight percent of an electrically insulating carrier.

The electrically photosensitive composite particles of this invention are useful in all electrically photosensitive materials, imaging layers and photoelectrophoretic imaging methods which require the combined action of an electric field and exposure to an image pattern of electromagnetic radiation to obtain an image. The Formula I materials are also useful in imaging processes such as those described in U.S. Pat. Nos. 3,520,681; 3,770,430; 3,795,195; 4,013,462; 3,707,368; 3,692,576 and 3,756,812, all relating to manifold imaging or photoelectrosolography.

In one photoelectrophoretic imaging method, an element comprising a conductive support, or a support having a conductive layer, in electrical contact with a liquefied or partially liquefied imaging layer of electrically photosensitive material is imaged in the following manner. An electrostatic charge pattern is formed on the imaging layer, for example, by uniformly electrostatically charging the layer and then exposing it to an image pattern of activating electromagnetic radiation. The electrically photosensitive particles in the imaging layer which have been exposed to radiation migrate through the imaging layer, leaving an undeveloped image record of the charge pattern on the conductive substrate. This image is developed by submerging the element in a solvent which removes or dissolves the exposed or the unexposed portions of the imaging layer.

In another such method, a liquid or at least a partially liquid electrically photosensitive imaging layer is positioned between two spaced electrodes. While so positioned between two spaced electrodes, the imaging layer is subjected to an electric field and exposed to an image pattern of activating radiation. As a consequence, the charge-bearing, electrically photosensitive particles in the imaging layer migrate to one or the other of the electrode surfaces to form on at least one of the electrodes an image record representing a positive-sense or negative-sense image of the original image pattern. The image record is developed by separation of the electrodes. In this process, the layer of electrically photosensitive material may be sandwiched between two support sheets to form an imaging element. After application of the field and exposure, a visual record of the image pattern is developed on at least one of the two sheets by separation of the sheets. The support sheets may be electrodes. Or electrodes may be directly attached to the back surfaces of the support sheets. Alternatively, one or both of the support sheets may be made of a conductive material. In some embodiments, at least one of the sheets is transparent so as to permit exposure of the imaging layer.

In each of the foregoing methods, the imaging layer of electrically photosensitive material is, or can be rendered, at least partially liquid. The phrase "partially liquid" is used herein to mean that the cohesive forces of the materials forming the layer are sufficiently weak, or weakened, to permit some imagewise migration of the electrically photosensitive material, under the combined influence of exposure to activating electromagnetic radiation and an electric field, in the layer of electrically photosensitive material.

In general, imaging layers which are not at least partially liquid may be rendered at least partially liquid by treatment with, for example, heat, a solvent and/or solvent vapors before, during or after the exposure to an image pattern of electromagnetic radiation and application of an electric field. Good results are obtained if the layer is liquefied subsequent to the exposure and field application steps. In the latter situation, the imaging layer is liquefied in the presence of an electric field and the image is developed according to one of the techniques previously mentioned herein.

The extent to which the electrically photosensitive materials migrate in those imaging layers which must be liquefied can be controlled by varying the strength and duration of the electric field, the intensity and duration of the exposure and the time which the imaging layer is exposed to a particular liquefying medium such as heat and/or solvent. For example, if the imaging layer is only slightly liquefied, the electrically photosensitive material will migrate only slightly, thus forming an underdeveloped image record. This image layer, containing the underdeveloped image record, can be stored and developed more fully at a later date. This delayed development can be carried out simply by placing the underdeveloped image layer in an electric field and then liquefying the layer sufficiently to allow the exposed electrically photosensitive material to resume migration. Development of the visual record of the image pattern is then carried out according to one of the above-mentioned techniques.

Generally, the electrically photosensitive material of this invention will comprise from about 0.05 part to about 2.0 parts of electrically photosensitive composite particles for each 10 parts by weight of electrically insulating carrier material.

Useful liquefiable electrically insulating carriers are disclosed in aforementioned U.S. Pat. Nos. 3,520,681; 3,975,195; 4,013,462; 3,707,368; 3,692,516 and 3,756,812. The carrier can comprise an electrically insulating liquid such as decane, paraffin, Sohio Odorless Solvent 3440 (a kerosene fraction marketed by the Standard Oil Company, Ohio), various isoparaffinic hydrocarbon liquids, such as those sold under the trademark Isopar G by Exxon Corporation and having a boiling point in the range of 145° C. to 186° C., various halogenated hydrocarbons such as carbon tetrachloride, trichloromonofluoromethane and the like, various alkylated aromatic hydrocarbon liquids such as the alkylated benzenes, for example, xylenes, and other alkylated aromatic hydrocarbons such as are described in U.S. Pat. No. 2,899,335. An example of one such useful alkylated aromatic hydrocarbon liquid which is commercially available is Solvesso 100 sold by Exxon Corporation. Solvesso 100 has a boiling point in the range of about 157° C. to about 177° C. and contains 98% percent by volume of $C_8$ to $C_{12}$ aromatics. Typically, whether solid or liquid at normal room temperatures, i.e., about 22° C. the electrically insulating carrier used in the present invention has a resistivity greater than about $10^9$ ohm-cm, preferably greater than about $10^{12}$ ohm-cm.

In general, electrically photosensitive material useful in photoelectrophoretic imaging layers and processes according to this invention comprise particles having an average particle size within the range of from about 0.01 micron to about 20 microns, preferably from about 0.01 to about 5 microns.

As stated hereinbefore, the electrically photosensitive materials may also contain various nonphotosensitive materials such as electrically insulating polymers, charge control agents, various organic and inorganic fillers, as well as various additional dyes or pigment materials to change or enhance various colorant and physical properties of the electrically photosensitive particle. Such electrically photosensitive materials may also contain other photosensitive materials such as various sensitizing dyes and/or chemical sensitizers to alter or enhance their response characteristics to activating radiation.

Illustrative charge control agents include those disclosed by Stahly in U.S. Pat. No. 4,219,614 issued Aug. 26, 1980. The polymeric charge control agents disclosed therein comprise a copolymer having at least two different repeating units, (a) one of said units being present in an amount of at least about $0.5 \times 10^{-4}$ moles/gram of said copolymer and being derived from monomers selected from the group consisting of metal salts of sulfoalkyl acrylates and methacrylates and metal salts of acrylic and methacrylic acids, and (b) one of said repeating units being derived from monomers soluble in said carrier vehicle and present in an amount sufficient to render said copolymer soluble in said carrier vehicle.

Examples of such copolymers are poly(vinyltoluene-co-lauryl methacrylate-co-lithium methacrylate-co-methacrylic acid); poly(styrene-co-lauryl methacrylate-co-lithium sulfoethyl methacrylate); poly(vinyltoluene-co-lauryl methacrylate-co-lithium methacrylate); poly(t-butylstyrene-co-lauryl methacrylate-co-lithium methacrylate-co-methacrylic acid) or poly(t-butylstyrene-co-lithium methacrylate).

In addition to the foregoing charge control agent materials, various polymeric binder materials such as various natural, semi-synthetic or synthetic resins may be dispersed or dissolved in the electrically insulating carrier to serve as a fixing material for the final photosensitive particle image formed on one of the spaced electrodes used in photoelectrophoretic imaging methods. Here again, the use of such fixing addenda is conventional and well known in the closely related art of liquid electrographic developer compositions so that extended discussion thereof is unnecessary herein.

The utility of the electrically photosensitive composite particles comprising the ionic polyesters of this invention in a photoelectrophoretic imaging method will be described in more detail with reference to the accompanying drawing, FIG. 1, which illustrates a typical apparatus for carrying out photoelectrophoretic imaging methods.

FIG. 1 shows a transparent electrode 1 supported by two rubber drive rollers 10 capable of imparting a translating motion via original image 11 to electrode 1 in the direction of the arrow. Electrode 1 may be composed of a layer of optically transparent material, such as glass or an electrically insulating, transparent polymeric support such as polyethylene terephthalate, covered with a thin, optically transparent, conductive layer such as tin oxide, indium oxide, nickel and the like. Optionally, depending upon the particular type of photoelectrophoretic imaging method desired, the surface of electrode 1 may bear a "dark charge exchange" material, such as a solid solution of an electrically insulating polymer and 2,4,7-trinitro-9-fluorenone as described by Groner in U.S. Pat. No. 3,976,485 issued Aug. 24, 1976, and incorporated herein by reference.

Spaced opposite electrode 1 and in pressure contact therewith is a second electrode 5, an idler roller which serves as a counter electrode to electrode 1 for producing the electric field used in the exemplified electrophoretic imaging method. Typically, electrode 5 has on the surface thereof a thin, electrically insulating layer 6. Electrode 5 is connected to one side of the power source 15 by switch 7. The opposite side of the power source 15 is connected to electrode 1 so that as an exposure takes place, switch 7 is closed and an electric field is applied to the electrically photosensitive particulate layer 4 which is positioned between electrodes 1 and 5. Typically, electrically photosensitive particulate material is dispersed in an electrically insulating carrier material such as described hereinabove to form layer 4.

The photoelectrophoretic imaging layer 4 may be formed between electrodes 1 and 5 by applying a dispersion containing an electrically photosensitive material according to the present invention to either or both of the surfaces of electrodes 1 and 5 prior to the imaging method or by placing the dispersion between electrodes 1 and 5 during the photoelectrophoretic imaging method.

As shown in FIG. 1, exposure of layer 4 takes place by use of an exposure system consisting of light source 8, an original image 11 to be reproduced, such as a photographic transparency, a lens system 12, and any necessary or desirable radiation filters 13, such as color filters, whereby layer 4 is irradiated with a pattern of activating radiation corresponding to original image 11. Although the photoelectrophoretic imaging method represented in FIG. 1 shows electrode 1 to be transparent to activating radiation from light source 8, it is possible to irradiate layer 4 in the nip 21 between electrodes 1 and 5 without either of electrodes 1 or 5 being transparent. In such a system, although not shown in FIG. 1, the exposure source 8 and lens system 12 is arranged so that layer 4 is exposed in the nip or gap 21 between electrodes 1 and 5.

As shown in FIG. 1, electrodes 5 is a roller electrode having a conductive core 14 connected to power source 15. The core is in turn covered with a layer of insulating material 6, for example, baryta paper. Insulating material 6 serves to prevent or at least substantially reduce the capability of electrically photosensitive material in layer 4 to undergo a radiation-induced charge alteration upon interaction with electrode 5. Hence, the term "blocking electrode" may be used, as is conventional in the art of photoelectrophoretic imaging, to refer to electrode 5.

Although electrode 5 is shown as a roller electrode and electrode 1 is shown as essentially a translatable, flat transparent plate electrode in FIG. 1, either or both of these electrodes may assume a variety of different shapes such as a web electrode, rotating drum electrode, opaque plate electrode and the like, as is well known in the field of photoelectrophoretic imaging. In general, during a typical photoelectrophoretic imaging method wherein layer 4 comprises electrically photosensitive particulate material dispersed in an electrically insulating, liquid carrier, electrodes 1 and 5 are spaced such that they are in pressure contact or very close to one another during the photoelectrophoretic imaging method, e.g., less than 50 microns apart. However, where the electrically photosensitive particulate material is simply dispersed without a liquid carrier in an air gap between electrodes 1 and 5 or in a carrier such as a layer of heat or solvent-liquefiable material coated as a separate layer on electrode 1 and/or 5, these electrodes may be spaced more than 50 microns apart during the imaging method.

The strength of the electric field imposed between electrodes 1 and 5 during the photoelectrophoretic imaging method may vary considerably; however, it has generally been found that optimum image density and resolution are obtained by increasing the field strength to as high a level as possible without causing electrical breakdown of the carrier medium in the electrode gap. For example, when electrically insulating liquids such as isoparaffinic hydrocarbons are used as the carrier in the imaging apparatus of FIG. 1, the applied voltage across electrodes 1 and 5 typically is within the range of from about 100 volts to about 4 kilovolts or higher.

As explained hereinabove, image formation occurs in photoelectrophoretic imaging methods as the result of the combined action of activating radiation and electric field on the electrically photosensitive particulate material disposed between electrodes 1 and 5 in the attached drawing. Typically, for best results, field strength, activating radiation intensity, incorporation of suitable light-sensitive addenda in the electrically photosensitive composite particles of this invention, it is possible to alter the timing of the exposure and field application events so that one may use sequential exposure and field application events rather than concurrent field application and exposure events.

When disposed between imaging electrodes 1 and 5 of FIG. 1, electrically photosensitive particulate material in layer 4 exhibits an electrostatic charge polarity, either as a result of triboelectric interaction of the particles or as a result of the particles interacting with the carrier material in which they are dispersed, for example, an electrically insulating liquid, such as occurs in conventional liquid electrographic developing compositions composed of toner particles which acquire a charge upon being dispersed in an electrically insulating carrier liquid.

Image discrimination occurs in photoelectrophoretic imaging methods as a result of the combined application of electric field and activating radiation on the electrically photosensitive particulate material layer 4 positioned between electrodes 1 and 5 of the apparatus shown in FIG. 1. That is, in a typical imaging operation, upon application of an electric field between electrodes 1 and 5, the particles of charge-bearing, electrically photosensitive material are attracted in the dark to either electrodes 1 or 5, depending upon which of these electrodes has a polarity opposite to that of the original charge polarity acquired by the electrically photosensitive particles. And, it is theorized that, upon exposing layer 4 to activating electromagnetic radiation, there occurs reversal of the charge polarity associated with either the exposed or unexposed particles. In typical photoelectrophoretic imaging methods wherein electrode 1 bears a conductive surface, the exposed, electrically photosensitive particles 4, upon coming into electrical contact with such conductive surface, undergo a reversal of their original charge polarity as a result of the combined application of electric field and activating radiation. Alternatively, in the case of photoimmobilized photoelectrophoretic recording (PIER), wherein the surface of electrode 1 bears a dark charge exchange material as described by Groner in aforementioned U.S. Pat. No. 3,976,485, one obtains reversal of the charge polarity of the unexposed particles, while maintaining the original charge polarity of the exposed electrically photosensitive particles, as these particles come into electrical contact with the dark charge-exchange surface of electrode 1. In any case, upon the application of electric field and activating radiation to layer 4 disposed between electrodes 1 and 5 of the apparatus shown in FIG. 1, one can effectively obtain image discrimination so that an image pattern is formed by the electrically photosensitive particle layer which corresponds to the original pattern of activating radiation. Typically, using the apparatus shown in FIG. 1, one obtains a visible image on the surface of electrode 1 and a complementary image pattern on the surface of electrode 5.

Subsequent to the application of the electric field and exposure to activating radiation, the images which are formed on the surface of electrodes 1 and/or 5 of the apparatus shown in FIG. 1 may be temporarily or permanently fixed to these electrodes or may be transferred to a final image receiving element. Fixing of the final particle image can be effected by various techniques, for example, by applying a resinous coating over the surface of the image bearing substrate or dispersing in the liquid carrier of the electrically photosensitive layer between electrodes 1 and 5 a polymeric binder material. Many such binders (which are well known for use in liquid electrophotographic liquid developers) are known to acquire a charge polarity upon being admixed in a carrier liquid and therefore will, themselves, electrophoretically migrate to the surface of one or the other of the electrodes. Alternatively, a coating of resinous binder (which has been dissolved in the carrier liquid), may be formed on the surfaces of electrodes 1 and/or 5 upon evaporation of the liquid carrier.

The following examples illustrate the invention, the parts and percentages being by weight unless otherwise stated.

EXAMPLE 1

Image Evaluation Apparatus

An image evaluation apparatus was used in each of the succeeding examples to carry out the electrophoretic imaging method described herein. This apparatus was a device of the type illustrated in FIG. 1. In this apparatus, a translating NESA or NESATRON (trademarks of PPG for a conductive tin oxide treated glass or a conductive indium oxide sputtered glass, respectively) glass plate served as electrode 1 and was in pressure contact with a 10 centimeter diameter aluminum roller 5 covered with, for example, a dielectric paper overcoated with a poly(vinylbutyral resin) purchased under the trade name Butvar B-76 from Monsanto Chemical Corporation or a cellulose acetate —$TiO_2$— Estane electrode from B.F. Goodrich Company.

NESA plate 1 was supported by two 2.8 cm diameter rubber drive rollers 10 positioned beneath NESA plate 1 such that a 2.5 cm opening, symmetric with the axis of the aluminum roller 5, existed to allow exposure of electrically photosensitive particle dispersion 4 to activating radiation. The original transparency 11 to be reproduced was taped to the back side of NESA plate 1. The exposing activating radiation was supplied from a light source 8 consisting of a Kodak Carousel projector and had a maximum intensity of 3500 foot candles at the NESA glass plate exposure plane. The voltage between the electrode 5 and NESA plate 1 was variable up to 10 kilovolts. However, most tests were made in the 0.4 to 2 KV range. NESA plate 1 was negative in polarity. The translational speed of NESA plate 1 was variable between about 1.25 cm and about 30 cm per second. In the following examples, image formation occurs on the surfaces of NESA glass plate 1 and electrode 5 after simultaneous application of light exposure and electric field to electrically photosensitive dispersion 4. In this image-evaluation apparatus, each different group of composite particles to be evaluated for use as a composite electrically photosensitive dispersion 4 was admixed with a liquid carrier as described in the examples to form a liquid imaging dispersion which was placed in nip 21 between the electrodes 1 and 5. If the material being evaluated for use in dispersion 4 possessed a useful level of electrical photosensitivity, one obtained a negative-appearing image reproduction of original 11 on electrode 5 and the complementary positive image on electrode 1.

Electrically Photosensitive Materials

Electrically photosensitive layers containing electrically photosensitive composite particles were prepared using the following general formulation:

| | |
|---|---|
| PVT [poly(vinyltoluene-co-lauryl methacrylate-co-methacrylic acid, lithium salt-co-methacrylic acid)] | 2.0 g |
| Pigment [2(4,5-dihydro-N—methyl-naphtho[1,2-d]-thiazol-2-ylidene)-N'—methylisoquinoline-1,3-dione] | 2.0 g |
| Solvesso 100 | 50.0 g |
| Table I Polymer | 4.0 g |

The above ingredients were placed in a 4.0 oz. brown glass bottle, ½ filled with (⅛") stainless steel balls and milled at room temperature for 5 days to form a concentrate. The composite particle, comprising a Table I ionic polyester, was then precipitated by placing the milled concentrate in an ultrasonic unit and then injecting 350 ml of Isopar G ™ while the ultrasonic probe was on. The composite particles were collected by centrifugation and then redispersed in the presence of PVT in Isopar G in a 4 oz. glass bottle ⅓ filled with ⅛" stainless steel balls on a Red Devil Paint Shaker for 20 minutes to yield a final composite particle dispersion which comprised 4% pigment, 4% PVT and 8% Table I polymer on a weight-to-weight basis.

Each of the ionic polyesters described in Table I was used to make composite particles. A separate imaging layer was formed from each set of particles tested according to the just outlined procedures. Each of the layers was found to be electrically photosensitive as evidenced by obtaining a negative-appearing image of the original on one electrode and a complementary image on the other electrode. Ionic polyesters 2, 7 and 8 provided images having good to excellent quality. Image quality was determined visually with regard to minimum and maximum densities, speed and color saturation.

EXAMPLE 2

Figure 3:
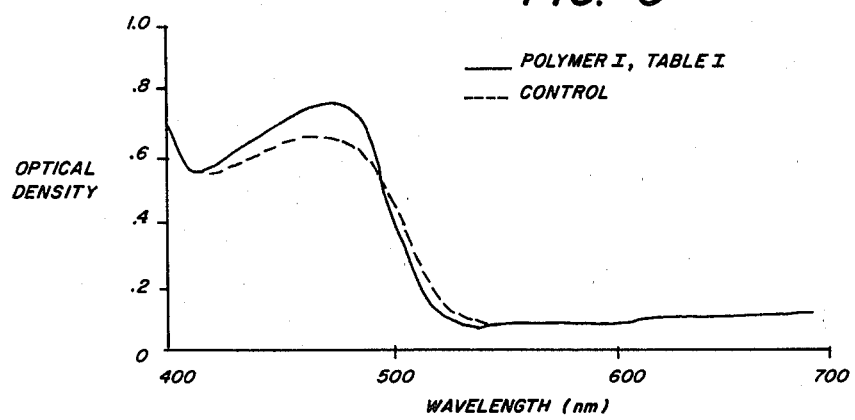

Three sets of electrically photosensitive layers were prepared according to the procedure of Example 1. Each set consisted of two different dispersions. The composite particles of one set contained the same pigment. However, a different pigment was used in each set. One dispersion in each set was a control. The control included composite particles prepared with non-ionic polymer poly(di-p-tolylaminostyrene). The latter polymer is disclosed for use in making electrically photosensitive composite particles in aforementioned U.S. Ser. No. 064,972, filed Aug. 8, 1979, by Merrill et al., now U.S. Pat. No. 4,322,487 issued Mar. 30, 1982. The second dispersion of each set contained composite particles containing polymer 2 of Table I. The size of the composite particles and relative speed were measured for each dispersion. The speed was measured for the positive image 0.1 above $D_{min}$ using a MacBeth Reflection Densitometer. Pigment crystal sizes were measured using electron microscopy techniques. The results are set out in Table III. Spectrophotometric curves for color patches prepared from these dispersions are shown in FIGS. 2, 3 and 4.

TABLE III

| Set | Polymer | Pigment | Size (μ) | Relative Exposure ergs/cm² |
|---|---|---|---|---|
| 1 | Polymer 1, Table I (A) | 2(4,5-dihydro-N—methyl-naphtho-[1,2-d]-thiazol-2-ylidene)-N'—methylisoquinoline-1,3-dione | .1–.2 | 0.06 |
| | Control | | .1–1.0 | 1.0* |
| 2 | Polymer 1, Table I (A) | Epindolidone | .1–.2 | .33 |
| | Control | Epindolidone | .1–.5 | 1.0* |
| 3 | Polymer 1, Table I (A) | Mixed Quinacridone | .1–.2 | .20 |
| | Control | Mixed Quinacridone | .1–.3 | 1.0* |

*Arbitrarily assigned a value of 1.0.

Table III provides clear evidence that compared to the control dispersions, the layers containing composite particles prepared with the ionic polyesters of the present invention have (a) a smaller pigment crystal size range and (b) greater speed. Moreover, FIGS. 2, 3, and 4 show that the absorption peaks of the materials of this invention are sharper than the absorption peaks of the control materials. These sharper absorption peaks result from the smaller pigment crystal size in the composite particles of the invention compared to the pigment size crystal of the control composite particles.

EXAMPLE 3

Seven electrically photosensitive imaging layers were prepared using the procedure of Example 1. Each layer comprised composite particles containing the pigment used in Example 1 and a different ionic polyester from Table I. The pigment crystal sizes were measured as in Example 1 with the following results:

TABLE I

| Ionic Polyester | Pigment Crystal Size (μ) |
|---|---|
| 6 | 0.7–0.1 |
| 5 | 1.5–0.1 |
| 31 | 0.8–0.1 |
| 10 | 0.7–0.1 |
| 7 | 0.2–0.1 |
| 16 | 0.2–0.1 |
| 20 | 0.3–0.1 |

The "Pigment Crystal Size" column indicates the range of crystal sizes observed. The smaller pigment crystal sizes, compared to the controls of Example 2, would yield photoelectrophoretic migration imaging dispersions having higher tinctorial strength, sharper absorption peaks and reduced light scatter.

The invention has been described in detail with particular reference to preferred embodiments thereof, but it will be understood that variations and modifications can be effected within the spirit and scope of the invention.

We claim:

1. A photoelectrophoretic image recording method comprising the steps of:

(a) subjecting an imaging element comprising a layer of an electrically photosensitive material to an electrical field; and (b) exposing said element to an image pattern of electromagnetic radiation to which said layer is photosensitive to form a record of the image pattern of electromagnetic radiation in said layer; wherein, said layer contains composite electrically photosensitive particles comprising a colorant and an ionic polyester comprising, as an integral part of the polymer backbone, repeating units from diol derived and diacid derived components, of which:

a diacid derived component contains a moiety selected from the group consisting of an alkali metal or ammonium sulfoarylene, -sulfoaryloxyarylene, -sulfocycloalkylene, -iminodisulfonylarylene, -iminobis(sulfonylarylene) and sulfoaralkylarylene, and a diol or diacid derived component contains a moiety selected from the group consisting of bis(N-alkyl-N-alkyleneaminoaryl)arylalkane; bis(N-alkyl-N-alkyleneaminoaryl)diarylalkane; bis(N-alkyl-N-alkyleneaminoaryl)isoalkane; bis(N-alkyl-N-alkyleneaminoaryl)cycloalkane; dialkyleneaminotetraarylalkane; bis(alkylenearyl)arylamine and alkylenetriarylamine.

2. A method as in claim 1 wherein the ionic polyester has the structure:

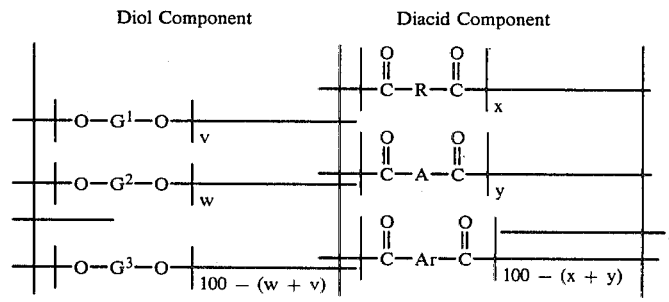

wherein:
v is about 20 to about 100 mole percent of the diol component, except when R or Ar is a group defined for $G^1$, v may be zero;
w is about 0 to 80 mole percent of the diol component;
x is about 85 to about 99 mole percent of the diacid component;
y is about 1 to about 15 mole percent of the diacid component;
$G^1$ is:

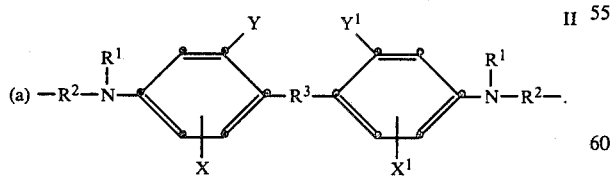

wherein:
$R^1$ is alkyl, aralkyl or aryl;
$R^2$ is alkylene or arylalkylene;
X and $X^1$, which are the same or different, are hydrogen, alkyl, alkoxy, hydroxyl, cyano, $NO_2$ or halogen;

Y and $Y^1$, which are the same or different, are hydrogen, alkyl, alkoxy, hydroxyl, cyano, halogen or $NO_2$;
$R^3$ is alkylene, arylalkylene, diarylalkylene, isoalkylene and cycloalkylidene, which can be substituted with hydrogen, alkoxy, hydroxyl, halogen, alkyl, dialkylamino, cycloalkyl, cycloalkenyl, alkyl and aryl;

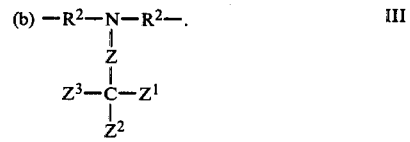

wherein:
$R^2$ is as defined for Formula II;
Z is arylene; and
$Z^1$, $Z^2$ and $Z^3$, which are the same or different, are aryl;

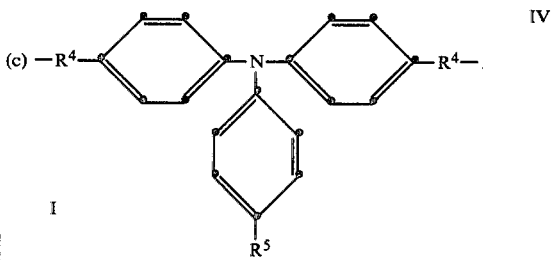

wherein:
$R^4$ is alkylene, alkyleneoxy or alkylenecarbonyl and
$R^5$ is hydrogen, alkyl or alkoxy; or

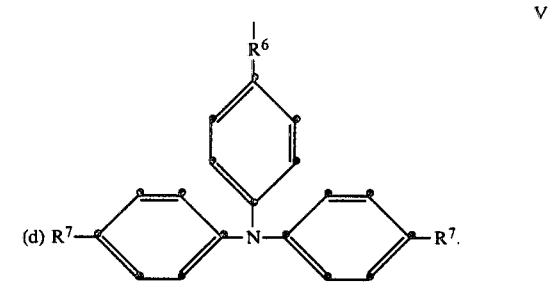

$R^6$ is alkylene and $R^7$ is hydrogen, alkyl, alkaryl, aralkyl or alkoxy;
$G^2$ and $G^3$, which are always different, are oxybis(alkylene), cycloalkylenedialkylene, cycloalkylenedioxyalkylene, arylaminedialkylene, arylene, piperazinylenedialkylene, cycloalkylene or a straight- or branched-chain alkylene;

R and Ar, which are always different; are a component selected from the group consisting of alkylene, cycloalkylene and arylene, or a component having a structure defined for $G^1$ above; and A is an alkali metal or ammonium sulfoarylene, -sulfoaryloxyarylene, -sulfocycloalkylene, -iminodisulfonylarylene, -iminobis(sulfonylarylene) or -sulfoaralkylarylene.

3. A method as in claim 1 wherein the ionic polyester has the structure:

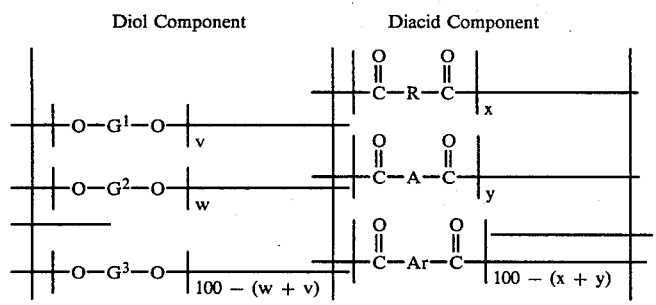

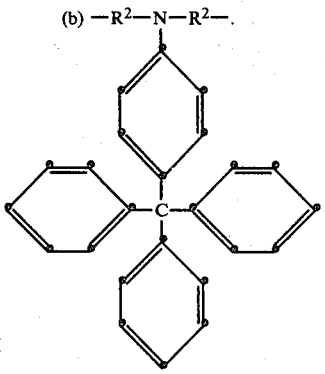

VI (b) $-R^2-N-R^2-$. VIII wherein:

v is about 20 to about 100 mole percent of the diol component, except when R is a group defined for $G^1$, v is zero;

w is about 0 to about 80 mole percent of the diol component;

x is about 85 to about 99 mole percent of the acid component;

y is about 1 to about 15 mole percent of the acid component;

$G^1$ is:

(a) 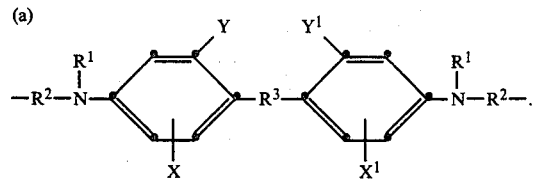 VII wherein:
$R^1$ is alkyl;
$R^2$ is alkylene;
X, $X^1$, Y and $Y^1$ are hydrogen or alkyl;
$R^3$ is phenylmethylene, diphenylmethylene, phenylethylidene, cyclohexylidene and isobutylidene;

wherein:
$R^2$ is as defined for $R^2$ in Formula VII; or
(c) 4,4'-dialkylenetriarylamine; and
(d) diphenylaminoarylethylene;

$G^2$ and $G^3$, which are always different, are oxybis(alkylene), cycloalkylenedialkylene, cycloalkylenedioxyalkylene, arylaminedialkylene, arylene, piperazinylenedialkylene, cycloalkylene or a straight- or branched-chain alkylene;

R and Ar, which are always different; are a component selected from the group consisting of alkylene, cycloalkylene and arylene, and A is an alkali metal or ammonium sulfophenylene, -sulfophenoxyphenylene, -sulfocyclohexylene, -5-[N-(4-tolylsulfonyl)iminosulfonyl]-1,3-phenylene or -iminobis(sulfonyl-1,3-phenylene).

4. A method as in claim 1 wherein the ionic polyester is selected from the group consisting of poly[4,4'-bis(N-ethyl-N-ethyleneamino)-2,2'-dimethyltriphenylmethane-co-tetramethylene terephthalate-co-5-sodiosulfoisophthalate]; poly[4,4'-bis(N-ethyl-N-ethyleneamino)-2,2'-dimetyltriphenylmethane-co-tetramethylene terephthalate-co-5-(4-tolylsulfonylpotassiiminosulfonyl)isophthalate]; poly[4,4'-bis(N-ethyl-N-ethyleneamino)-2,2'-dimethyltriphenylmethane-co-isopentylene terephthalate-co-3,3'-sodioiminobis(sulfonylbenzoate)]; poly[4,4'-bis(N-ethyl-N-ethyleneamino)-2,2'-dimethyltriphenylmethane-co-tetramethylene-1,4-cyclohexanedicarboxylate-co-3,3'-sodioiminobis(sulfonylbenzoate)]; poly-[4,4'-bis(N-ethyl-N-ethyleneamino)-2,2'-dimethyltriphenylmethane-co-N,N-diethyleneaniline terephthalate-co-3,3'-sodioiminobis(sulfonylbenzoate)]; poly-[1,1-bis(4-[N-ethyl-N-ethyleneamino]phenyl)cyclohexylidene terephthalate-co-3,3'-sodioiminobis(sulfonylbenzoate)]; poly[1,1-bis(4-[N-ethyl-N-ethyleneamino]-2-methylphenyl)-2-phenylethane-co-tetramethylene terephthalate-co-3,3'- sodioiminobis(sulfonylbenzoate)]; poly[tetramethylene-N,N-bis(4-hydrocinnamate)-4-toluidine-co-3,3'-sodioiminobis(sulonylbenzoate)]; and poly[4,4'-bis(N-ethyl-N-ethyleneamino)tetraphenylmethane-co-3,3'-sodioiminobis(sulfonylbenzoate)].

5. A method as in claims 1, 2, 3 or 4 further comprising the steps of:
(a) placing said element between two electrodes during the exposure and application of the electric field and then
(b) separating the electrodes thereby forming a visual record of the image pattern of electromagnetic radiation on at least one of the electrodes.

6. A method as in claims 1, 2, 3 or 4 further comprising the steps of:
(a) placing said layer between two support sheets to form the imaging element;
(b) positioning the element between two electrodes during the exposure and application of the electric field; and
(c) separating the two support sheets thereby forming a visual record of the image pattern of electromagnetic record on the support sheets.

7. A method as in claims 1, 2, 3 or 4 further comprising the step of developing a visual record of the image pattern of electromagnetic radiation by removing the exposed or unexposed portion of said layer.

* * * * *

UNITED STATES PATENT AND TRADEMARK OFFICE
CERTIFICATE OF CORRECTION

PATENT NO. : 4,361,636                    Page 1 of 3
DATED      : November 30, 1982
INVENTOR(S) : Isaacson and Regan It is certified that error appears in the above-identified patent and that said Letters Patent are hereby corrected as shown below:

Title page, 1st column, item [54], line 4, "PHOTOELECTROPHOTO-RETIC" should read --PHOTOELECTROPHORETIC--. Column 1, line 4, "PHOTOELECTROPHOTORETIC" should read --PHOTOELECTROPHORETIC--; lines 18-19, "photoelectophoretic" should read --photoelectropho-retic--. Column 2, line 34, "bis(alkyleneraryl)arylamine" should read --bis(alkylenearyl)arylamine--. Column 3, line 29, "y" should read --v--. Columns 23-24, lines 3-16, the formula set forth as:

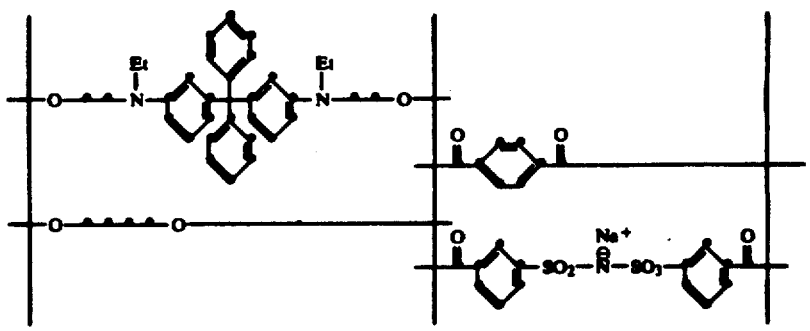

should read

UNITED STATES PATENT AND TRADEMARK OFFICE
CERTIFICATE OF CORRECTION

PATENT NO. : 4,361,636

DATED : November 30, 1982

INVENTOR(S) : Isaacson and Regan

It is certified that error appears in the above-identified patent and that said Letters Patent are hereby corrected as shown below:

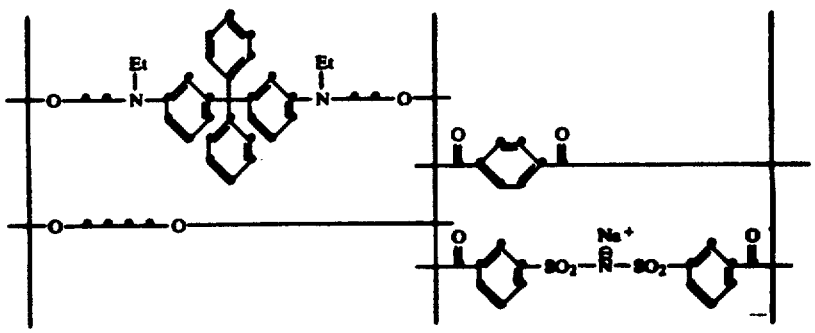

Column 30, line 32, "electrodes" should read --electrode--. Column 34, lines 45-46:

| TABLE I | |
|---|---|
| Ionic Polyester | Pigment Crystal Size ($\mu$) | should read

| Table I Ionic Polyester | Pigment Crystal Size ($\mu$) |
|---|---|

UNITED STATES PATENT AND TRADEMARK OFFICE
CERTIFICATE OF CORRECTION

PATENT NO. : 4,361,636
DATED : November 30, 1982
INVENTOR(S) : Isaacson and Regan It is certified that error appears in the above-identified patent and that said Letters Patent is hereby corrected as shown below:

Column 38, line 53, that part of the formula reading "ethyleneamino)-2,2'-dimetyltriphenylmethane" should read --ethyleneamino)-2,2'-dimethyltriphenylmethane--.

Signed and Sealed this

Twenty-ninth Day of May 1984

[SEAL]

Attest:

GERALD J. MOSSINGHOFF

Attesting Officer

Commissioner of Patents and Trademarks